US008139546B2

(12) United States Patent
Proctor, Jr.

(10) Patent No.: US 8,139,546 B2
(45) Date of Patent: Mar. 20, 2012

(54) SYSTEM AND METHOD FOR MAINTAINING WIRELESS CHANNELS OVER A REVERSE LINK OF A CDMA WIRELESS COMMUNICATION SYSTEM

(75) Inventor: James A. Proctor, Jr., Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

(21) Appl. No.: 12/768,445

(22) Filed: Apr. 27, 2010

(65) Prior Publication Data
US 2010/0208708 A1  Aug. 19, 2010

Related U.S. Application Data

(63) Continuation of application No. 11/183,520, filed on Jul. 18, 2005, now Pat. No. 7,746,830, which is a continuation of application No. 10/755,874, filed on Jan. 12, 2004, now Pat. No. 6,940,842, which is a continuation of application No. 09/997,621, filed on Nov. 29, 2001, now Pat. No. 6,678,260, which is a continuation of application No. 09/730,376, filed on Dec. 5, 2000, now Pat. No. 6,707,804, which is a continuation of application No. 09/088,413, filed on Jun. 1, 1998, now Pat. No. 6,222,832.

(51) Int. Cl.
*H04B 7/216* (2006.01)
(52) U.S. Cl. ........................................ 370/335; 370/342
(58) Field of Classification Search .................. 370/335, 370/329, 342, 350, 441
See application file for complete search history.

(56) References Cited

U.S. PATENT DOCUMENTS

| 3,560,978 A | 2/1971 | Himmel et al. |
| 3,725,938 A | 4/1973 | Black et al. |
| 3,742,498 A | 6/1973 | Dunn |
| 3,846,799 A | 11/1974 | Guegen |
| 3,950,753 A | 4/1976 | Chisholm |

(Continued)

FOREIGN PATENT DOCUMENTS

DE  2812575  9/1979

(Continued)

OTHER PUBLICATIONS

Attachment 2, *High Speed Data RLP* Lucent Technologies, Version 0.1, Jan. 16, 1997.

(Continued)

*Primary Examiner* — Brian D Nguyen
(74) *Attorney, Agent, or Firm* — Volpe and Koenig, P.C.

(57) ABSTRACT

A subscriber access unit includes a transceiver for providing wireless communication of digital signals. The digital signals are communicated to a base station using at least one radio frequency (RF) channel via Code Division Multiple Access (CDMA) modulated radio signals defined by orthogonal codes. Orthogonal subchannels are made available by the base station within each CDMA RF channel. A bandwidth manager is connected to the transceiver, and when the transceiver is actively sending data, at least one orthogonal subchannel is allocated by the base station on an as-needed basis. The number of orthogonal subchannels being allocated changes during a given session. The transceiver, when powered on but not actively sending data, provides an idling mode connection on a reverse link. The idling mode connection is based on an orthogonal subchannel shared with at least one other subscriber access unit, but utilizes different time slots of the shared orthogonal subchannel.

15 Claims, 5 Drawing Sheets

U.S. PATENT DOCUMENTS

| | | |
|---|---|---|
| 4,021,813 A | 5/1977 | Black et al. |
| 4,099,184 A | 7/1978 | Rapshys |
| 4,107,469 A | 8/1978 | Jenkins |
| 4,170,766 A | 10/1979 | Pridham et al. |
| 4,260,994 A | 4/1981 | Parker |
| 4,290,071 A | 9/1981 | Fenwick |
| 4,387,378 A | 6/1983 | Henderson |
| 4,448,155 A | 5/1984 | Hillebrand et al. |
| 4,488,155 A | 12/1984 | Wu |
| 4,577,316 A | 3/1986 | Schiff |
| 4,599,733 A | 7/1986 | Gutleber |
| 4,625,308 A | 11/1986 | Kim et al. |
| 4,631,546 A | 12/1986 | Dumas et al. |
| 4,642,806 A | 2/1987 | Hewitt et al. |
| 4,675,863 A | 6/1987 | Paneth et al. |
| 4,700,197 A | 10/1987 | Milne |
| 4,817,089 A | 3/1989 | Paneth et al. |
| 4,841,526 A | 6/1989 | Wilson et al. |
| 4,862,453 A | 8/1989 | West et al. |
| 4,866,709 A | 9/1989 | West et al. |
| 4,887,266 A * | 12/1989 | Neve et al. ............... 370/349 |
| 4,912,705 A | 3/1990 | Paneth et al. |
| 4,949,395 A | 8/1990 | Rydbeck |
| 4,954,950 A | 9/1990 | Freeman et al. |
| 5,022,024 A | 6/1991 | Paneth et al. |
| 5,027,125 A | 6/1991 | Tang |
| 5,027,348 A | 6/1991 | Curry |
| 5,027,400 A | 6/1991 | Baji et al. |
| 5,038,149 A | 8/1991 | Aubry et al. |
| 5,056,109 A | 10/1991 | Gilhousen et al. |
| 5,068,916 A | 11/1991 | Harrison et al. |
| 5,101,416 A | 3/1992 | Fenton et al. |
| 5,103,459 A | 4/1992 | Gilhousen et al. |
| 5,114,375 A | 5/1992 | Wellhausen et al. |
| 5,115,309 A | 5/1992 | Hang |
| 5,117,236 A | 5/1992 | Chang et al. |
| 5,124,981 A | 6/1992 | Golding |
| 5,130,983 A | 7/1992 | Heffner, III |
| 5,166,929 A | 11/1992 | Lo |
| 5,226,044 A | 7/1993 | Gupta et al. |
| 5,235,343 A | 8/1993 | Audren et al. |
| 5,257,283 A | 10/1993 | Gilhousen et al. |
| 5,267,262 A | 11/1993 | Wheatley, III |
| 5,268,900 A | 12/1993 | Hluchyj et al. |
| 5,280,472 A | 1/1994 | Gilhousen et al. |
| 5,282,222 A | 1/1994 | Fattouche et al. |
| 5,293,172 A | 3/1994 | Lamberty et al. |
| 5,294,939 A | 3/1994 | Sanford et al. |
| 5,303,240 A | 4/1994 | Borras et al. |
| 5,325,394 A | 6/1994 | Bruckert |
| 5,325,419 A | 6/1994 | Connolly et al. |
| 5,337,316 A | 8/1994 | Weiss et al. |
| 5,339,316 A | 8/1994 | Diepstraten |
| 5,353,332 A | 10/1994 | Raith et al. |
| 5,355,374 A | 10/1994 | Hester et al. |
| 5,373,502 A | 12/1994 | Turban |
| 5,375,124 A | 12/1994 | D'Ambrogio et al. |
| 5,377,192 A | 12/1994 | Goodings et al. |
| 5,388,102 A | 2/1995 | Griffith et al. |
| 5,394,473 A | 2/1995 | Davidson |
| 5,412,429 A | 5/1995 | Glover |
| 5,414,728 A | 5/1995 | Zehavi |
| 5,422,887 A | 6/1995 | Diepstraten et al. |
| 5,430,452 A | 7/1995 | DuBois |
| 5,437,055 A | 7/1995 | Wheatley, III |
| 5,442,625 A | 8/1995 | Gitlin et al. |
| 5,446,727 A | 8/1995 | Bruckert et al. |
| 5,463,629 A | 10/1995 | Ko |
| 5,471,463 A | 11/1995 | Hulbert |
| 5,479,176 A | 12/1995 | Zavrel, Jr. |
| 5,481,533 A | 1/1996 | Honig et al. |
| 5,487,180 A | 1/1996 | Ohtake |
| 5,490,136 A | 2/1996 | Sereno et al. |
| 5,493,569 A | 2/1996 | Buchholtz et al. |
| 5,502,447 A | 3/1996 | Kumpfbeck et al. |
| 5,511,068 A | 4/1996 | Sato |
| 5,537,397 A | 7/1996 | Abramson |
| 5,537,414 A | 7/1996 | Takiyasu et al. |
| 5,550,828 A | 8/1996 | Gries et al. |
| 5,559,789 A | 9/1996 | Nakano et al. |
| 5,577,022 A | 11/1996 | Padovani et al. |
| 5,581,575 A | 12/1996 | Zehavi et al. |
| 5,585,850 A | 12/1996 | Schwaller |
| 5,586,119 A | 12/1996 | Scribano et al. |
| 5,590,409 A | 12/1996 | Sawahashi et al. |
| 5,592,178 A | 1/1997 | Chang et al. |
| 5,592,468 A | 1/1997 | Sato |
| 5,592,470 A | 1/1997 | Rudrapatna et al. |
| 5,592,471 A | 1/1997 | Briskman |
| 5,598,416 A | 1/1997 | Yamada et al. |
| 5,598,417 A | 1/1997 | Crisler et al. |
| 5,604,730 A | 2/1997 | Tiedemann, Jr. |
| 5,606,580 A | 2/1997 | Mourot et al. |
| 5,617,102 A | 4/1997 | Prater |
| 5,617,423 A | 4/1997 | Li et al. |
| 5,619,492 A | 4/1997 | Press et al. |
| 5,619,524 A | 4/1997 | Ling et al. |
| 5,621,752 A | 4/1997 | Antonio et al. |
| 5,634,199 A | 5/1997 | Gerlach et al. |
| 5,642,348 A | 6/1997 | Barzegar et al. |
| 5,642,377 A | 6/1997 | Chung et al. |
| 5,652,764 A | 7/1997 | Kanzaki et al. |
| 5,655,001 A | 8/1997 | Cline et al. |
| 5,657,326 A | 8/1997 | Burns et al. |
| 5,657,358 A | 8/1997 | Panech et al. |
| 5,663,958 A | 9/1997 | Ward |
| 5,663,990 A | 9/1997 | Bolgiano et al. |
| 5,673,259 A | 9/1997 | Quick, Jr. |
| 5,680,142 A | 10/1997 | Smith et al. |
| 5,684,794 A | 11/1997 | Lopez et al. |
| 5,687,194 A | 11/1997 | Paneth et al. |
| 5,689,502 A | 11/1997 | Scott |
| 5,697,059 A | 12/1997 | Carney |
| 5,699,364 A | 12/1997 | Sato et al. |
| 5,708,656 A | 1/1998 | Noneman et al. |
| 5,712,869 A | 1/1998 | Lee et al. |
| 5,715,236 A | 2/1998 | Gilhousen et al. |
| 5,726,981 A | 3/1998 | Ylitervo et al. |
| 5,734,646 A | 3/1998 | I et al. |
| 5,739,784 A | 4/1998 | Jan et al. |
| 5,742,592 A | 4/1998 | Scholefield et al. |
| 5,745,484 A | 4/1998 | Scott |
| 5,758,288 A | 5/1998 | Dunn et al. |
| 5,764,648 A | 6/1998 | Yamane et al. |
| 5,767,807 A | 6/1998 | Pritchett |
| 5,781,542 A | 7/1998 | Tanaka et al. |
| 5,781,543 A | 7/1998 | Ault et al. |
| 5,784,406 A | 7/1998 | DeJaco et al. |
| 5,790,549 A | 8/1998 | Dent |
| 5,790,551 A | 8/1998 | Chan |
| 5,793,744 A | 8/1998 | Kanerva et al. |
| 5,802,046 A | 9/1998 | Scott |
| 5,802,465 A | 9/1998 | Hamalainen et al. |
| 5,805,994 A | 9/1998 | Perreault et al. |
| 5,812,131 A | 9/1998 | Bertram |
| 5,825,807 A | 10/1998 | Kumar |
| 5,828,659 A | 10/1998 | Teder et al. |
| 5,828,662 A | 10/1998 | Jalali et al. |
| 5,838,720 A | 11/1998 | Morelli |
| 5,841,768 A | 11/1998 | Ozluturk et al. |
| 5,844,894 A | 12/1998 | Dent |
| 5,845,211 A | 12/1998 | Roach |
| 5,854,786 A | 12/1998 | Henderson et al. |
| 5,856,971 A | 1/1999 | Gitlin et al. |
| 5,859,840 A | 1/1999 | Tiedemann, Jr. et al. |
| 5,859,879 A | 1/1999 | Bolgiano et al. |
| 5,862,476 A | 1/1999 | Hasegawa et al. |
| 5,867,527 A | 2/1999 | Ziv et al. |
| 5,872,786 A | 2/1999 | Shobatake |
| 5,873,043 A | 2/1999 | Comer |
| 5,881,060 A | 3/1999 | Morrow et al. |
| 5,881,368 A | 3/1999 | Grob et al. |
| 5,884,196 A | 3/1999 | Lekven et al. |
| 5,892,774 A | 4/1999 | Zehavi et al. |
| 5,893,035 A | 4/1999 | Chen |
| 5,894,473 A | 4/1999 | Dent |
| 5,896,376 A | 4/1999 | Alperovich et al. |

| | | | | | | |
|---|---|---|---|---|---|---|
| 5,898,929 A | 4/1999 | Haartsen | | 6,201,966 B1 | 3/2001 | Rinne et al. |
| 5,903,834 A | 5/1999 | Wallstedt et al. | | 6,208,871 B1 | 3/2001 | Hall et al. |
| 5,905,473 A | 5/1999 | Taenzer | | 6,212,175 B1 | 4/2001 | Harsch |
| 5,910,944 A | 6/1999 | Callicotte et al. | | 6,212,220 B1 | 4/2001 | Proctor, Jr. |
| 5,910,945 A | 6/1999 | Garrison et al. | | 6,214,342 B1 | 4/2001 | Alberici et al. |
| 5,914,950 A | 6/1999 | Tiedemann, Jr. et al. | | 6,215,798 B1 | 4/2001 | Carneheim et al. |
| 5,915,216 A | 6/1999 | Lysejko | | 6,219,342 B1 | 4/2001 | Rege |
| 5,918,170 A * | 6/1999 | Oksanen et al. ............ 455/343.4 | | 6,222,828 B1 | 4/2001 | Ohlson et al. |
| 5,923,650 A | 7/1999 | Chen et al. | | 6,222,832 B1 | 4/2001 | Proctor |
| 5,926,500 A | 7/1999 | Odenwalder | | 6,222,873 B1 | 4/2001 | Bang et al. |
| 5,930,230 A | 7/1999 | Odenwalder et al. | | 6,226,279 B1 | 5/2001 | Hansson et al. |
| 5,933,781 A | 8/1999 | Willenegger et al. | | 6,226,527 B1 | 5/2001 | Dalsgaard et al. |
| 5,943,362 A | 8/1999 | Saito | | 6,233,439 B1 | 5/2001 | Jalali |
| 5,949,814 A | 9/1999 | Odenwalder et al. | | 6,236,646 B1 | 5/2001 | Beming et al. |
| 5,950,131 A | 9/1999 | Vilmur | | 6,236,647 B1 | 5/2001 | Amalfitano |
| 5,956,332 A | 9/1999 | Rasanen et al. | | 6,236,674 B1 | 5/2001 | Morelli et al. |
| 5,959,980 A | 9/1999 | Scott | | 6,243,372 B1 | 6/2001 | Petch et al. |
| 5,960,361 A | 9/1999 | Chen | | 6,246,673 B1 | 6/2001 | Tiedemann et al. |
| 5,963,559 A | 10/1999 | Ohki | | 6,246,715 B1 | 6/2001 | Park et al. |
| 5,966,374 A | 10/1999 | Rasanen | | RE37,301 E | 7/2001 | Lo |
| 5,974,036 A | 10/1999 | Acharya et al. | | 6,256,509 B1 | 7/2001 | Tanaka et al. |
| 5,982,760 A | 11/1999 | Chen | | 6,259,683 B1 | 7/2001 | Sekine et al. |
| 5,990,806 A | 11/1999 | Mock et al. | | 6,262,980 B1 | 7/2001 | Leung et al. |
| 5,991,279 A | 11/1999 | Haugli et al. | | 6,263,013 B1 | 7/2001 | Hendrickson |
| 5,991,284 A | 11/1999 | Willenegger et al. | | 6,269,075 B1 | 7/2001 | Tran |
| 5,991,618 A | 11/1999 | Hall | | 6,269,088 B1 | 7/2001 | Masui et al. |
| 6,001,800 A | 12/1999 | Mehta et al. | | 6,272,168 B1 | 8/2001 | Lomp et al. |
| 6,002,690 A | 12/1999 | Takayama et al. | | 6,272,354 B1 | 8/2001 | Saaroi |
| 6,005,852 A | 12/1999 | Kokko et al. | | 6,275,478 B1 | 8/2001 | Tiedemann, Jr. |
| 6,005,855 A | 12/1999 | Zehavi et al. | | 6,278,701 B1 | 8/2001 | Ayyagari et al. |
| 6,009,106 A | 12/1999 | Rustad et al. | | 6,285,665 B1 | 9/2001 | Chuah |
| 6,011,800 A | 1/2000 | Nadgauda et al. | | 6,292,474 B1 | 9/2001 | Ali et al. |
| 6,016,312 A | 1/2000 | Storn et al. | | 6,301,286 B1 | 10/2001 | Kanterakis et al. |
| 6,028,868 A | 2/2000 | Yeung et al. | | 6,301,291 B1 | 10/2001 | Rouphael et al. |
| 6,031,827 A | 2/2000 | Rikkinen et al. | | 6,304,215 B1 | 10/2001 | Proctor, Jr. et al. |
| 6,031,832 A | 2/2000 | Turina | | 6,307,840 B1 | 10/2001 | Wheatley, III et al. |
| 6,034,638 A | 3/2000 | Thiel et al. | | 6,310,859 B1 | 10/2001 | Morita et al. |
| 6,037,905 A | 3/2000 | Koscica et al. | | 6,314,300 B1 | 11/2001 | Nakashima et al. |
| 6,038,450 A | 3/2000 | Brink et al. | | 6,317,092 B1 | 11/2001 | De Schweinitz et al. |
| 6,049,535 A | 4/2000 | Ozluturk | | 6,320,851 B1 | 11/2001 | Kim et al. |
| 6,049,538 A | 4/2000 | Scott | | 6,332,008 B1 | 12/2001 | Giallorenzi et al. |
| 6,052,385 A | 4/2000 | Kanerva et al. | | 6,337,668 B1 | 1/2002 | Ito et al. |
| 6,058,338 A | 5/2000 | Agashe et al. | | 6,339,612 B1 * | 1/2002 | Stewart et al. ................ 375/140 |
| 6,064,678 A | 5/2000 | Sindhushayana et al. | | 6,353,412 B1 | 3/2002 | Soliman |
| 6,069,880 A | 5/2000 | Owen et al. | | 6,353,645 B1 | 3/2002 | Solve et al. |
| 6,069,883 A | 5/2000 | Ejzak et al. | | 6,356,538 B1 * | 3/2002 | Li ................................ 370/311 |
| 6,070,071 A | 5/2000 | Chavez et al. | | 6,356,555 B1 | 3/2002 | Rakib |
| 6,075,974 A | 6/2000 | Saints et al. | | 6,366,570 B1 | 4/2002 | Bhagalia |
| 6,078,572 A | 6/2000 | Tanno et al. | | 6,366,786 B1 | 4/2002 | Norman et al. |
| 6,081,536 A * | 6/2000 | Gorsuch et al. ................ 370/468 | | 6,370,117 B1 | 4/2002 | Koraitim et al. |
| 6,088,335 A | 7/2000 | I et al. | | 6,373,830 B1 | 4/2002 | Ozluturk |
| 6,094,421 A | 7/2000 | Scott | | 6,373,834 B1 | 4/2002 | Lundh et al. |
| 6,094,576 A | 7/2000 | Häkkinen et al. | | 6,377,548 B1 | 4/2002 | Chuah |
| 6,097,707 A * | 8/2000 | Hodzic et al. .................. 370/321 | | 6,377,809 B1 | 4/2002 | Rezaiifar et al. |
| 6,097,733 A | 8/2000 | Basu et al. | | 6,388,997 B1 | 5/2002 | Scott |
| 6,097,972 A | 8/2000 | Saints et al. | | 6,388,999 B1 | 5/2002 | Gorsuch et al. |
| 6,100,843 A | 8/2000 | Proctor, Jr. et al. | | 6,389,000 B1 | 5/2002 | Jou |
| 6,101,176 A | 8/2000 | Honkasalo et al. | | 6,396,804 B2 | 5/2002 | Odenwalder |
| 6,101,179 A | 8/2000 | Soliman | | 6,396,823 B1 | 5/2002 | Park et al. |
| 6,104,708 A | 8/2000 | Bergamo | | 6,418,148 B1 | 7/2002 | Kumar et al. |
| 6,111,863 A | 8/2000 | Rostoker et al. | | 6,424,645 B1 | 7/2002 | Kawabata et al. |
| 6,112,092 A | 8/2000 | Benveniste | | 6,426,960 B2 | 7/2002 | Antonio |
| 6,115,370 A | 9/2000 | Struhsaker et al. | | 6,452,911 B1 | 9/2002 | Seo |
| 6,118,767 A | 9/2000 | Shen et al. | | 6,452,913 B1 | 9/2002 | Proctor, Jr. |
| 6,125,148 A * | 9/2000 | Frodigh et al. ................ 375/261 | | 6,453,176 B1 | 9/2002 | Lopes et al. |
| 6,134,233 A | 10/2000 | Kay | | 6,456,608 B1 | 9/2002 | Lomp |
| 6,151,332 A | 11/2000 | Gorsuch et al. | | 6,466,800 B1 | 10/2002 | Sydon et al. |
| 6,157,616 A | 12/2000 | Whitehead | | 6,469,991 B1 | 10/2002 | Chuah |
| 6,157,619 A | 12/2000 | Ozluturk et al. | | 6,473,623 B1 | 10/2002 | Benveniste |
| 6,161,013 A | 12/2000 | Anderson et al. | | 6,483,816 B2 | 11/2002 | Tsunehara et al. |
| 6,163,707 A | 12/2000 | Miller | | 6,490,461 B1 | 12/2002 | Muller |
| 6,169,731 B1 | 1/2001 | Stewart et al. | | 6,498,785 B1 | 12/2002 | Derryberry et al. |
| 6,169,759 B1 | 1/2001 | Kanterakis et al. | | 6,498,790 B1 | 12/2002 | Shaheen et al. |
| 6,185,184 B1 | 2/2001 | Mattaway et al. | | 6,498,939 B1 | 12/2002 | Thomas |
| 6,185,266 B1 | 2/2001 | Kuchi et al. | | 6,501,787 B1 | 12/2002 | Odenwalder et al. |
| 6,188,678 B1 | 2/2001 | Prescott | | 6,504,830 B1 | 1/2003 | Östberg et al. |
| 6,188,903 B1 | 2/2001 | Gardner et al. | | 6,512,751 B1 | 1/2003 | Struhsaker et al. |
| 6,195,362 B1 | 2/2001 | Darcie et al. | | 6,512,931 B1 | 1/2003 | Kim et al. |
| 6,198,723 B1 | 3/2001 | Parruck et al. | | 6,519,452 B1 | 2/2003 | Agostino et al. |

| | | |
|---|---|---|
| 6,519,651 B1 | 2/2003 | Dillon |
| 6,522,639 B1 | 2/2003 | Kitade et al. |
| 6,526,039 B1 | 2/2003 | Dahlman et al. |
| 6,526,064 B1 | 2/2003 | Bousquet |
| 6,526,281 B1 | 2/2003 | Gorsuch et al. |
| 6,532,226 B1 | 3/2003 | Lehtinent et al. |
| 6,532,365 B1 | 3/2003 | Anderson et al. |
| 6,542,481 B2 | 4/2003 | Foore et al. |
| 6,545,986 B1 | 4/2003 | Stellakis |
| 6,545,994 B2 | 4/2003 | Nelson et al. |
| 6,546,252 B1 | 4/2003 | Jetzek et al. |
| 6,567,389 B1 * | 5/2003 | Honkasalo et al. ............ 370/342 |
| 6,567,391 B1 | 5/2003 | Moon |
| 6,567,416 B1 | 5/2003 | Chuah |
| 6,567,670 B1 | 5/2003 | Petersson |
| 6,570,865 B2 | 5/2003 | Masui et al. |
| 6,571,296 B1 | 5/2003 | Dillon |
| 6,574,211 B2 | 6/2003 | Padovani et al. |
| 6,587,446 B2 | 7/2003 | Sarkar et al. |
| 6,597,913 B2 | 7/2003 | Natarajan |
| 6,611,231 B2 | 8/2003 | Crilly et al. |
| 6,611,514 B1 | 8/2003 | Moulsley |
| 6,621,807 B1 | 9/2003 | Jung et al. |
| 6,621,808 B1 | 9/2003 | Sadri |
| 6,628,945 B1 | 9/2003 | Koorapaty et al. |
| 6,633,554 B1 | 10/2003 | Dalal |
| 6,647,000 B1 | 11/2003 | Persson et al. |
| 6,674,739 B1 | 1/2004 | Lee et al. |
| 6,687,509 B2 | 2/2004 | Schmutz et al. |
| 6,690,652 B1 | 2/2004 | Sadri |
| 6,690,938 B1 | 2/2004 | Chin |
| 6,697,642 B1 | 2/2004 | Thomas |
| 6,707,804 B2 | 3/2004 | Proctor |
| 6,717,916 B1 | 4/2004 | Ahn et al. |
| 6,718,180 B1 | 4/2004 | Lundh et al. |
| 6,724,740 B1 | 4/2004 | Choi et al. |
| 6,724,743 B1 | 4/2004 | Pigeonnat |
| 6,731,954 B1 | 5/2004 | Katz |
| 6,735,188 B1 | 5/2004 | Becker et al. |
| 6,760,596 B1 | 7/2004 | Fiorini et al. |
| 6,768,727 B1 | 7/2004 | Sourour et al. |
| 6,775,558 B1 | 8/2004 | Ranta et al. |
| 6,782,277 B1 | 8/2004 | Chen et al. |
| 6,785,247 B1 | 8/2004 | Lee |
| 6,788,661 B1 | 9/2004 | Ylitalo et al. |
| 6,795,416 B1 | 9/2004 | Han et al. |
| 6,804,219 B2 | 10/2004 | Koo et al. |
| 6,807,221 B2 | 10/2004 | Kim et al. |
| 6,826,169 B1 | 11/2004 | Nagatani et al. |
| 6,831,910 B1 | 12/2004 | Moon et al. |
| 6,845,089 B1 | 1/2005 | Gu et al. |
| 6,868,075 B1 | 3/2005 | Narvinger et al. |
| 6,925,068 B1 | 8/2005 | Stanwood et al. |
| 6,931,252 B1 | 8/2005 | Aroudaki |
| 6,934,319 B2 | 8/2005 | Subramanian |
| 6,940,845 B2 | 9/2005 | Benveniste |
| 6,954,444 B2 | 10/2005 | Ji et al. |
| 6,956,840 B1 | 10/2005 | Proctor, Jr. |
| 6,963,540 B2 | 11/2005 | Choi et al. |
| 6,977,910 B1 | 12/2005 | Hosur et al. |
| 6,999,471 B1 | 2/2006 | Frazer et al. |
| 7,027,420 B2 | 4/2006 | Hamalainen |
| 7,046,717 B2 | 5/2006 | Kanterakis et al. |
| 7,079,507 B2 | 7/2006 | Toskala et al. |
| 7,079,523 B2 | 7/2006 | Nelson, Jr. et al. |
| 7,099,629 B1 | 8/2006 | Bender |
| 7,136,377 B1 | 11/2006 | Tweedly et al. |
| 7,158,504 B2 | 1/2007 | Kadaba et al. |
| 7,218,623 B1 | 5/2007 | Proctor |
| 7,221,664 B2 | 5/2007 | Proctor |
| 7,266,107 B2 | 9/2007 | Choi et al. |
| 7,340,256 B2 | 3/2008 | Speight |
| 2001/0030990 A1 | 10/2001 | Rouphael et al. |
| 2001/0033558 A1 | 10/2001 | Matsuki |
| 2001/0036200 A1 | 11/2001 | Nelson et al. |
| 2001/0038674 A1 | 11/2001 | Trans |
| 2001/0039191 A1 | 11/2001 | Maierhofer |
| 2002/0009061 A1 | 1/2002 | Willenegger |
| 2002/0012332 A1 | 1/2002 | Tiedemann et al. |
| 2002/0045441 A1 | 4/2002 | Ralston et al. |
| 2002/0080024 A1 | 6/2002 | Nelson et al. |
| 2002/0097700 A1 | 7/2002 | Alastalo |
| 2002/0141478 A1 | 10/2002 | Ozluturk et al. |
| 2003/0060224 A1 | 3/2003 | Nelson et al. |
| 2003/0095517 A1 | 5/2003 | Proctor, Jr. |
| 2003/0123401 A1 | 7/2003 | Dean |
| 2004/0005078 A1 | 1/2004 | Tillotson |
| 2004/0009785 A1 | 1/2004 | Nelson et al. |
| 2004/0047328 A1 | 3/2004 | Proctor et al. |
| 2004/0073803 A1 | 4/2004 | Keramane |
| 2004/0160910 A1 | 8/2004 | Gorsuch et al. |
| 2004/0180696 A1 | 9/2004 | Foore et al. |
| 2005/0208961 A1 | 9/2005 | Willenegger |

FOREIGN PATENT DOCUMENTS

| | | |
|---|---|---|
| EP | 0 443 061 | 8/1991 |
| EP | 0 526 106 | 2/1993 |
| EP | 0 682 423 | 11/1995 |
| EP | 0 682 426 | 11/1995 |
| EP | 0 719 062 | 6/1996 |
| EP | 0 720 309 | 7/1996 |
| EP | 0 475 698 | 3/1997 |
| EP | 0 773 636 | 5/1997 |
| EP | 0 808 074 | 11/1997 |
| EP | 0 907 262 | 4/1999 |
| EP | 0 910 176 | 4/1999 |
| EP | 1 018 809 | 12/2000 |
| GB | 2 326 524 | 12/1998 |
| JP | 59-050603 | 3/1984 |
| JP | 02-177643 | 7/1990 |
| JP | 03-049324 | 3/1991 |
| JP | 04-284033 | 10/1992 |
| JP | 05-030006 | 2/1993 |
| JP | 07-067164 | 3/1995 |
| JP | 07-095151 | 4/1995 |
| JP | 07-264098 | 10/1995 |
| JP | 08-065273 | 3/1996 |
| JP | 08-242482 | 9/1996 |
| JP | 09-023203 | 1/1997 |
| JP | 09-055693 | 2/1997 |
| TW | 566045 | 12/2003 |
| TW | 200536325 | 11/2005 |
| WO | 93/15573 | 8/1993 |
| WO | 95/08900 | 3/1995 |
| WO | 96/08934 | 3/1996 |
| WO | 96/19050 | 6/1996 |
| WO | 96/37081 | 11/1996 |
| WO | 96/27994 | 12/1996 |
| WO | 97/46041 | 4/1997 |
| WO | 97/23073 | 6/1997 |
| WO | 97/26726 | 7/1997 |
| WO | 97/32412 | 9/1997 |
| WO | 97/46044 | 12/1997 |
| WO | 98/09455 | 3/1998 |
| WO | 99/14869 | 3/1999 |
| WO | 99/31811 | 6/1999 |
| WO | 99/52306 | 10/1999 |
| WO | 99/63682 | 12/1999 |
| WO | 00/72464 | 11/2000 |

OTHER PUBLICATIONS

Azad et al., Multirate Spread Spectrum Direct Sequence CDMA Techniques, 1994, The Institute of Electrical Engineers.

Bell Labs Technical Journal, Lucent Technologies, vol. 2, No. 3, Summer 1997.

Budka et al., Cellular Digital Packet Data Networks, Bell Labs Technical Journal, Summer 1997, pp. 164-181.

Cellular Digital Packet Data, System Specification, Release 1.1, Jan. 19, 1995.

Chelouah, A., et al., "Angular Diversity Based on Beam Switching of Circular Arrays for Hiperlan Terminals," *Electronics Letters*, vol. 36, No. 5, pp. 387-388, (Mar. 2, 2000).

Chih-Lin I et al., IS-95 Enhancements for Multimedia Services, Bell Labs Technical Journal, pp. 60-87, Autumn 1996.

Chih-Lin I et al., Load and Interference Based Demand Assignment (LIDA) for Integrated Services in CDMA Wireless Systems, Nov. 18, 1996, pp. 235-241.

Chih-Lin I et al., Multi-Code CDMA Wireless Personal Communications Networks, Jun. 18, 1005.

Chih-Lin I et al., Performance of Multi-Code CDMA Wireless Personal Communications Networks, Jul. 25, 1995.

Chih-Lin I et al., Variable Spreading Gain CDMA with Adaptive Control for True Packet Switching Wireless Network, 1995, pp. 725-730.

Chung, Packet Synchronization and Identification for Incremental Redundancy Transmission in FH-CDMA Systems, 1992, IEEE, pp. 292-295.

*Data Service Options for Wideband Spread Spectrum Systems.* TIA/EIA Interim Standard. TIA/EIA/IS-707-A. Apr. 1999.

Data Service Options for Wideband Spread Spectrum Systems: Introduction, PN-3676. 1 (to be published as TIA/EIA/IS-707.1), Mar. 20, 1997 (Content Revision 1).

*Data Services Option Standard for Wideband Spread Spectrum Digital Cellular System.* TIA/EIA/IS-99. TIA/EIA Interim Standard. Jul. 1995.

*Data Services Options Standard for Wideband Spread Spectrum Systems: Packet Data Services.* PN-3676.5 (to be published as TIA/EIA/IS-707.5) *Ballot Version*, May 30, 1997.

Data Standard, Packet Data Section, PN-3676.5 (to be published as TIA/EIA/IS-Data.5), Dec. 8, 1996, Version 02 (Content Revision 03).

Draft Text for "*95C" Physical Layer (Revision 4), Part 1, Document #531-981-20814-95C, Part 1 on 3GPP2 website (ftp://ftp.3gpp2.org/tsgc/working/1998/1298_Maui/WG3-TG1/531-98120814-95c,%20part%201.pdf).

Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%202.pdf, 1998).

Durnan, G.J., et al. "Optimization of Microwave Parabolic Antenna Systems Using Switched Parasitic Feed Structures," URSI National Science Meeting, Boulder, CO, p. 323, (Jan. 4-8, 2000).

Durnan, G.J., et al., "Switched Parasitic Feeds for Parabolic Antenna Angle Diversity," *Microwave and Optical Tech. Letters*, vol. 23, No. 4, pp. 200-203(Nov. 20, 1999).

Ejzak et al., Lucent Technologies Air Interface Proposal for CDMA High Speed Data Service, Revision 0.1, May 5, 1997.

Ejzak et al., Lucent Technologies Air Interface Proposal for CDMA High Speed Data Service, Apr. 14, 1997.

Ejzak, et al. *Proposal for High Speed Packet Data Servic, Version 0.1.* Lucent Technologies, Jan. 16, 1997.

Elhakeem, Congestion Control in Signalling Free Hybrid ATM/CDMA Satellite Network, IEEE, 1995, pp. 783-787.

Giger, A.J., *Low-Angle Microwave Propagation: Physics and Modeling*, Norwood, MA, Artech House, (1991).

Hall et al., Design and Analysis of Turbo Codes on Rayleigh Fading Channels, IEEE Journal on Selected Areas in Communications, vol. 16, No. 2, Feb. 1998, pp. 160-174.

Harrington, R.F., "Reactively Controlled Antenna Arrays," *IEEE APS International Symposium Digest*, Amherst, MA , pp. 62-65, (Oct. 1976).

Harrington, R.F., "Reactively Controlled Directive Arrays," *IEEE Trans. Antennas and Propagation*, vol. AP-26, No. 3, pp. 390-395, (May 1978).

Heine, Gunnar, "The Air-Interface of GSM", in GSM Networks: Protocols, Terminology, and Implementation, (MA: Artech House, Inc.), pp. 89-100 (1999).

High Data Rate (HDR) Solution, Qualcomm, Dec. 1998.

High Data Rate (HDR), cdmaOne optimized for high speed, high capacity data, Wireless Infrastructure, Qualcomm, Sep. 1998.

Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.

Honkasalo, Harri. *High Speed Data Air Interface.* 1996.

*Introduction to cdma2000 Spread Spectrum Systems, Release C.* TIA/EIA Interim Standard. TIA/EIA/IS-2000.1-C. May, 2002.

James , J.R. et al., "Electrically Short Monopole Antennas with Dielectric or Ferrite Coatings," Proc. IEEE, vol. 125, pp. 793-803, (Sep. 1978).

James, J.R., et al., "Reduction of Antenna Dimensions with Dielectric Loading," *Electronics Letters*, vol. 10, No. 13, pp. 263-265, (May 1974).

Kaiser et al., Multi-Carrier CDMA with Iterative Decoding and Soft-Interference Cancellation, Proceedings of Globecom 1997, vol. 1, pp. 523-529.

King, R.W.P., "The Many Faces of the Insulated Antenna," Proc. IEEE, vol. 64, No. 2, pp. 228-238, (Feb. 1976).

Kingsley, S.P., et al., "Beam Steering and Monopulse Processing of Probe-Fed Dielectric Resonator Antennas," *IEEE Proc.-Radar, Sonar, Navigation*, vol. 146, No. 3, pp. 121-125, (Jun. 1999).

Knight, P., "Low-Frequency Behavior of the Beverage Aerial," *Electronics Letter*, vol. 13, No. 1, pp. 21-22, (Jan. 1977).

Knisely, Douglas, N. Telecommunications Industry Association Subcommittee TR-45.5—*Wideband Spread Spectrum Digital Technologies Standards.* Banff, Alberta. Feb. 24, 1997 (TR45.5/97.02.24)21.

Knisely, Douglas, N. Telecommunications Industry Association Subcommittee Tr-45.5—Wideband Spread Spectrum Digital Technologies Standards, Working Group III-Physical Layer. Banff, Alberta. Feb. 24, 1997 (TR45.5/97.02.24)22.

Knisely, Lucent Technologies Air Interface Proposal for CDMA High Speed Data Service, Jan. 16, 1997.

Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.

Kumar et al, An Access Scheme for High Speed Packet Data Service on IS-95 based CDMA, Feb. 11, 1997.

Lau et al., A Channel-State-Dependent Bandwidth Allocation scheme for Integrated Isochronous and Bursty Media Data in a Cellular Mobile Information System, IEEE, 2000, pp. 524-528.

Liu et al., Channel Access and Interference Issues in Multi-Code DS-CDMA Wireless Packet (ATM) Networks, Wireless Networks 2, pp. 173-196,1996.

Long, S.A., et al., "The Resonant Cylindrical Dielectric Cavity Antenna," *IEEE Trans. Antennas and Propagation*, vol. AP-31, No. 3, pp. 406-412, (May 1983).

Lu, J., et al., "Multi-beam Switched Parasitic Antenna Embedded in Dielectric for Wireless Communications Systems," *Electronics Letters*, vol. 37, No. 14, pp. 871-872, (Jul. 5, 2001).

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Luzwick, J., et al., "A Reactively Loaded Aperture Antenna Array," *IEEE Trans. Antennas and Propagation*, vol. AP-26, No. 4, pp. 543-547, (Jul. 1978).

McCallister, M.W. et al., "Resonant Hemispherical Dielectric Antenna," *Electronics Letters*, vol. 20, No. 16, pp. 657-659, (Aug. 1984).

McCallister, M.W., et al., "Rectangular Dielectric Resonator Antenna," *Electronics Letter*, vol. 19, No. 6, pp. 218-219, (Mar. 1983).

Melanchuk et al. *CDPD and Emerging Digital Cellular Systems*, Digest of Papers of COMPCN, Computer Society Conference 1996, Santa Clara, CA, No. CONF. 41, Feb. 25, 1996, pp. 2-8, XP000628458.

Milne, R.M.T., "A Small Adaptive Array Antenna for Mobile Communications," *IEEE APS International Symposium Digest*, pp. 797-800, (1985).

Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.

Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.

Motorola, Version 1.0. *Motorola High Speed Data Air Interface Proposal Comparisions and Recommendations.* Jan. 27, 1997.

MSC-BS Interface (A-Interface) for Public 800 MHz. TIA/EIA/IS-634-A. TIA/EIA Interim Standard (Revision of TIA/EIA/IS-634) Jul. 1998.

MSC-BS Interface for Public 800 MHz.TIA/EIA/IS-634. TIA/EIA Interim Standard, Dec. 1995.

Network Wireless Systems Offer Business Unit (NWS OBU), Feature Definition Document for Code Division Multiple Access (CDMA) Packet Mode Data Services, FDD-1444, Nov. 26, 1996.
Ott, David TR45.5, CDMA WBSS Technical Standards Meeting Summary. Feb. 24-28, 1997 Banff, Alberta.
Ovesjö Frederik, European Telecommunication Standard, SMG2 UMTS physical Layer Expert Group, "UTRA Physical Layer Descriptions FDD parts" (v0.4, Jun. 25, 1998), pp. 1-41, XP-002141421.
Packet Data Service Option Standard for Wideband Spread Spectrum Systems, TIA/EIA Interim Standard, TIA/EIA/IS-657, Jul. 1996.
*Physical Layer Standard for cdma2000 Spread Spectrum Systems, Release C.* TIA/EIA Interim Standard. TIA/EIA/IS-2000.2C. May, 2002.
Preston, S., et al., "Direction Finding Using a Switched Parasitic Antenna Array," *IEEE APS International Symposium Digest*, Montreal, Canada, pp. 1024-1027, (1997).
Preston, S.L., et al., A Multibeam Antenna Using Switched Parasitic and Switched Active Elements for Space-Division Multiple Access Applications, *IEICE Trans. Electron.*, vol. E82-C, No. 7, pp. 1202-1210, (Jul. 1999).
Preston, S.L., et al., "Base-Station Tracking in Mobile Communications using a Switched Parasitic Antenna Array," *IEEE Trans. Antennas and Propagation*, vol. 46, No. 6, pp. 841-844, (Jun. 1998).
Preston, S.L., et al., "Electronic Beam Steering Using Switched Parasitic Patch Elements," *Electronics Letters*, vol. 33, No. 1, pp. 7-8, (Jan. 2, 1997).
Preston, S.L., et al., "Size Reduction of Switched Parasitic Directional Antennas Using Genetic Algorithm Optimization Techniques," *Asia Pacific Microwave Conference Proceedings*, Yokohama, Japan, pp. 1401-1404, (1998).
Preston, S.L., et al., "Systematic Approach to the Design of Directional Antennas Using Switched Parasitic and Switched Active Elements," *Asia Pacific Microwave Conference Proceedings*, Yokohama, Japan, pp. 531-534, (1998).
Puleston, PPP Protocol Spoofing Control Protocol, Global Village Communication (UK) Ltd., Feb. 1996.
Reed et al., Iterative Multiuser Detection for CDMA with FEC: Near-Single-User Performance, IEEE Transactions on Communications, vol. 46, No. 12, Dec. 1998, pp. 1693-1699.
Ruze, J., "Lateral-Feed Displacement in a Paraboloid," *IEEE Trans. Antennas and Propagation*, vol. 13, pp. 660-665, (1965).
Scott, N. L., et al., "Diversity Gain from a Single-Port Adaptive Antenna Using Switched Parasitic Elements Illustrated with a Wire and Monopole Prototype," *IEEE Trans. Antennas and Propagation*, vol. 47, No. 6, pp. 1066-1070, (Jun. 1999).
Shacham, et al., "A Selective-Repeat-ARQ Protocol for Parallel Channels and Its Resequencing Analysis," IEEE Transactions On Communications, XP000297814, 40 (4): 773-782 (Apr. 1997).
Sibille, A., et al., "Circular Switched Monopole Arrays for beam Steering Wireless Communications," *Electronics Letters*, vol. 33, No. 7, pp. 551-552, (Mar. 1997).
Simpson, W. (Editor). "RFC 1661—The Point-to-Point Protocol (PPP)." Network Working Group, Jul. 1994, pp. 1-35. http://www.faqs.org/rfcs/rfc1661.html.
Simpson, W. (Editor). "RFC 1662—PPP in HDLC-Like Framing." Network Working Group, Jul. 1994, pp. 1-17. http://www.faqs.org/rfcs/rfc1662.html.
Skinner et al., Performance of Reverse-Link Packet Transmission in Mobile Cellular CDMA Networks, IEEE, 2001, pp. 1019-1023.
Stage 1 Service Description for Data Services—High Speed Data Services (Version 0.10) CDG RF 38. Dec. 3, 1996.
*Support for 14.4 kbps Data Rate and PCS Interaction for Wideband Spread Spectrum Cellular Systems.* TSB74, Dec. 1995. TIA/EIA Telecommunications Systems Bulletin.
*Telecommunications Industry Association Meeting Summary.* Task Group I, Working Group III, Subcommittee TR45.5. Feb. 24-27, 1997. Banff, Alberta.
*Telecommunications Industry Association Meeting Summary.* Task Group I, Working Group III, Subcommittee TR45.5. Jan. 6-8, 1997. Newport Beach, California.

TIA/EIA Interim Standard, Mobile Station-Base Station Compatibility Standard for Dual-Mode Wideband Spread Spectrum Cellular System, TIA/EIA/IS-95 (Jul. 1993).
Tsui et al., "Sensitivity of EW Receivers," Microwave Journal, vol. 25, pp. 115-117, 120 (Nov. 1982).
*Upper Layer (Layer 3) Signaling Standard for cdma2000 Spread Spectrum Systems, Release C.* TIA/EIA Interim Standard. TIA/EIA/IS-2000.5-C. May, 2002.
Vaughn, R., "Switched Parasitic Elements for Antenna Diversity," *IEEE Trans. Antennas and Propagation*, vol. 47, No. 2, pp. 399-405, (Feb. 1999).
Viterbi, The Path to Next Generation Services with CDMA, Qualcomm Incorporated, 1998 CDMA Americas Congress, Los Angeles, California, Nov. 19, 1998.
Wang et al., The Performance of Turbo-Codes in Asynchronous DS-CDMA, IEEE Global Communications Conference, Phoenix, Arizona, USA, Nov. 3-8, 2007, Gol. III, pp. 1548-1551.
WWW.CDG.ORG/NEWS/PRESS/1997.ASP. *CDA Press Release Archive*, 1997.
Yang, Samuel C., "Principles of Code Division Multiple Access," In CDMA RF System Engineering, (MA: Artech House, Inc.), 1998, Chapter 4, pp. 75-103.
Attachment 2, *High Speed Data RLP* Lucent Technologies, Version 0.1, Jan. 16, 1997.
Azad et al., Multirate Spread Spectrum Direct Sequence CDMA Techniques, 1994, The Institute of Electrical Engineers.
Bell Labs Technical Journal, Lucent Technologies, vol. 2, No. 3, Summer 1997.
Budka et al., Cellular Digital Packet Data Networks, Bell Labs Technical Journal, Summer 1997, pp. 164-181.
Cellular Digital Packet Data, System Specification, Release 1.1, Jan. 19, 1995.
Chelouah, A., et al., "Angular Diversity Based on Beam Switching of Circular Arrays for Hiperlan Terminals," *Electronics Letters*, vol. 36, No. 5, pp. 387-388, (Mar. 2, 2000).
Chih-Lin I et al., IS-95 Enhancements for Multimedia Services, Bell Labs Technical Journal, pp. 60-87, Autumn 1996.
Chih-Lin I et al., Load and Interference Based Demand Assignment (LIDA) for Integrated Services in CDMA Wireless Systems, Nov. 18, 1996, pp. 235-241.
Chih-Lin I et al., Multi-Code CDMA Wireless Personal Communications Networks, Jun. 18, 1005.
Chih-Lin I et al., Performance of Multi-Code CDMA Wireless Personal Communications Networks, Jul. 25, 1995.
Chih-Lin I et al., Variable Spreading Gain CDMA with Adaptive Control for True Packet Switching Wireless Network, 1995, pp. 725-730.
Chung, Packet Synchronization and Identification for Incremental Redundancy Transmission in FH-CDMA Systems, 1992, IEEE, pp. 292-295.
*Data Service Options for Wideband Spread Spectrum Systems.* TIA/EIA Interim Standard. TIA/EIA/IS-707-A. Apr. 1999.
Data Service Options for Wideband Spread Spectrum Systems: Introduction, PN-3676. 1 (to be published as TIA/EIA/IS-707.1), Mar. 20, 1997 (Content Revision 1).
*Data Services Option Standard for Wideband Spread Spectrum Digital Cellular System.* TIA/EIA/IS-99. TIA/EIA Interim Standard. Jul. 1995.
*Data Services Options Standard for Wideband Spread Spectrum Systems: Packet Data Services.* PN-3676.5 (to be published as TIA/EIA/IS-707.5) Ballot Version, May 30, 1997.
Data Standard, Packet Data Section, PN-3676 (to be published as TIA/EIA/IS-Data.5), Dec. 8, 1996, Version 02 (Content Revision 03).
Draft Text for "*95C" Physical Layer (Revision 4), Part 1, Document #531-981-20814-95C, Part 1 on 3GPP2 website (ftp://ftp.3gpp2.org/tsgc/working/1998/1298_Maui/WG3-TG1/531-98120814-95c,%20part%201.pdf).
Draft Text for "95C" Physical Layer (Revision 4), Part 2, Document #531-981-20814-95C, part 2 on 3GPP2 website (ftp://ftp.3gpp2.org/tsgc/working/1998/1298_Maui/WG3-TG1/531-98120814-95c,%20part%202.pdf, 1998).

Durnan, G.J., et al. "Optimization of Microwave Parabolic Antenna Systems Using Switched Parasitic Feed Structures," URSI National Science Meeting, Boulder, CO, p. 323, (Jan. 4-8, 2000).

Durnan, G.J., et al., "Switched Parasitic Feeds for Parabolic Antenna Angle Diversity," *Microwave and Optical Tech. Letters*, vol. 23, No. 4, pp. 200-2003(Nov. 20, 1999).

Ejzak et al., Lucent Technologies Air Interface Proposal for CDMA High Speed Data Service, Revision 0.1, May 5, 1997.

Ejzak et al., Lucent Technologies Air Interface Proposal for CDMA High Speed Data Service, Apr. 14, 1997.

Ejzak, et al. *Proposal for High Speed Packet Data Service, Version 0.1*. Lucent Technologies, Jan. 16, 1997.

Elhakeem, Congestion Control in Signalling Free Hybrid ATM/CDMA Satellite Network, IEEE, 1995, pp. 783-787.

Giger, A.J., *Low-Angle Microwave Propagation: Physics and Modeling*, Norwood, MA, Artech House, (1991).

Hall et al., Design and Analysis of Turbo Codes on Rayleigh Fading Channels, IEEE Journal on Selected Areas in Communications, vol. 16, No. 2, Feb. 1998, pp. 160-174.

Harrington, R.F., "Reactively Controlled Antenna Arrays," *IEEE APS International Symposium Digest*, Amherst, MA, pp. 62-65, (Oct. 1976).

Harrington, R.F., "Reactively Controlled Directive Arrays," *IEEE Trans. Antennas and Propagation*, vol. AP-26, No. 3, pp. 390-395, (May 1978).

Heine, Gunnar, "The Air-Interface of GSM", in GSM Networks: Protocols, Terminology, and Implementation, (MA: Artech House, Inc.), pp. 89-100 (1999).

High Data Rate (HDR) Solution, Qualcomm, Dec. 1998.

High Data Rate (HDR), cdmaOne optimized for high speed, high capacity data, Wireless Infrastructure, Qualcomm, Sep. 1998.

Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.

Honkasalo, Harri. *High Speed Data Air Interface*. 1996.

*Introduction to cdma2000 Spread Spectrum Systems, Release C.* TIA/EIA Interim Standard. TIA/EIA/IS-2000.1-C. May, 2002.

James, J.R. et al., "Electrically Short Monopole Antennas with Dielectric or Ferrite Coatings," Proc. IEEE, vol. 125, pp. 793-803, (Sep. 1978).

James, J.R., et al., "Reduction of Antenna Dimensions with Dielectric Loading," *Electronics Letters*, vol. 10, No. 13, pp. 263-265, (May 1974).

Kaiser et al., Multi-Carrier CDMA with Iterative Decoding and Soft-Interference Cancellation, Proceedings of Globecom 1997, vol. 1, pp. 523-529.

King, R.W.P., "The Many Faces of the Insulated Antenna," Proc. IEEE, vol. 64, No. 2, pp. 228-238, (Feb. 1976).

Kingsley, S.P., et al., "Beam Steering and Monopulse Processing of Probe-Fed Dielectric Resonator Antennas," *IEEE Proc.-Radar, Sonar, Navigation*, vol. 146, No. 3, pp. 121-125, (Jun. 1999).

Knight, P., "Low-Frequency Behavior of the Beverage Aerial," *Electronics Letter*, vol. 13, No. 1, pp. 21-22, (Jan. 1977).

Knisely, Douglas, N. Telecommunications Industry Association Subcommittee TR-45.5—*Wideband Spread Spectrum Digital Technologies Standards*. Banff, Alberta. Feb. 24, 1997 (TR45.5/97.02.24)21.

Knisely, Douglas, N. Telecommunications Industry Association Subcommittee TR-45.5-Wideband Spread Spectrum Digital Technologies Standards, Working Group III-Physical Layer. Banff, Alberta. Feb. 24, 1997 (TR45.5/97.02.24)22.

Knisely, Lucent Technologies Air Interface Proposal for CDMA High Speed Data Service, Jan. 16, 1997.

Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.

Kumar et al, An Access Scheme for High Speed Packet Data Service on IS-95 based CDMA, Feb. 11, 1997.

Lau et al., A Channel-State-Dependent Bandwidth Allocation scheme for Integrated Isochronous and Bursty Media Data in a Cellular Mobile Information System, IEEE, 2000, pp. 524-528.

Lee et al., "A Novel Hybrid CDMA/TDMA Protocol with a Reservation Request Slot for Wireless ATM Networks," IEICE Transactions on Communications, vol. E82-B, No. 7, pp. 1073-1076 (Jul. 25, 1999). X**.

Liu et al., Channel Access and Interference Issues in Multi-Code DS-CDMA Wireless Packet (ATM) Networks, Wireless Networks 2, pp. 173-196, 1996.

Long, S.A., et al., "The Resonant Cylindrical Dielectric Cavity Antenna," *IEEE Trans. Antennas and Propagation*, vol. AP-31, No. 3, pp. 406-412, (May 1983).

Lu, J., et al., "Multi-beam Switched Parasitic Antenna Embedded in Dielectric for Wireless Communications Systems," *Electronics Letters*, vol. 37, No. 14, pp. 871-872, (Jul. 5, 2001).

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Luzwick, J., et al., "A Reactively Loaded Aperture Antenna Array," *IEEE Trans. Antennas and Propagation*, vol. AP-26, No. 4, pp. 543-547, (Jul. 1978).

McCallister, M.W. et al., "Resonant Hemispherical Dielectric Antenna," *Electronics Letters*, vol. 20, No. 16, pp. 657-659, (Aug. 1984).

McCallister, M.W., et al., "Rectangular Dielectric Resonator Antenna," *Electronics Letter*, vol. 19, No. 6, pp. 218-219, (Mar. 1983).

Melanchuk et al. *CDPD and Emerging Digital Cellular Systems*, Digest of Papers of COMPCN, Computer Society Conference 1996, Santa Clara, CA, No. CONF. 41, Feb. 25, 1996, pp. 2-8, XP000628458.

Milne, R.M.T., "A Small Adaptive Array Antenna for Mobile Communications," *IEEE APS International Symposium Digest*, pp. 797-800, (1985).

Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.

Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.

Motorola, Version 1.0. *Motorola High Speed Data Air Interface Proposal Comparisions and Recommendations*. Jan. 27, 1997.

*MSC-BS Interface (A-Interface) for Public 800 MHz*. TIA/EIA/IS-634-A. TIA/EIA Interim Standard (Revision of TIA/EIA/IS-634) Jul. 1998.

*MSC-BS Interface for Public 800 MHz*.TIA/EIA/IS-634. TIA/EIA Interim Standard, Dec. 1995.

Network Wireless Systems Offer Business Unit (NWS OBU), Feature Definition Document for Code Division Multiple Access (CDMA) Packet Mode Data Services, FDD-1444, Nov. 26, 1996.

Ott, David TR45.5, CDMA WBSS Technical Standards Meeting Summary. Feb. 24-28, 1997 Banff, Alberta.

Ovesjö Frederik, European Telecommunication Standard, SMG2 UMTS physical Layer Expert Group, "UTRA Physical Layer Descriptions FDD parts" (v0.4,Jun. 25, 1998), pp. 1-41, XP-002141421.

Packet Data Service Option Standard for Wideband Spread Spectrum Systems, TIA/EIA Interim Standard, TIA/EIA/IS-657, Jul. 1996.

*Physical Layer Standard for cdma2000 Spread Spectrum Systems, Release C.* TIA/EIA Interim Standard. TIA/EIA/IS-2000.2C. May 2002.

Preston, S., et al., "Direction Finding Using a Switched Parasitic Antenna Array," *IEEE APS International Symposium Digest*, Montreal, Canada, pp. 1024-1027, (1997).

Preston, S.L., et al., A Multibeam Antenna Using Switched Parasitic and Switched Active Elements for Space-Division Multiple Access Applications, *IEICE Trans. Electron.*, vol. E82-C, No. 7, pp. 1202-1210, (Jul. 1999).

Preston, S.L., et al., "Base-Station Tracking in Mobile Communications using a Switched Parasitic Antenna Array," *IEEE Trans. Antennas and Propagation*, vol. 46, No. 6, pp. 841-844, (Jun. 1998).

Preston, S.L., et al., "Electronic Beam Steering Using Switched Parasitic Patch Elements," *Electronics Letters*, vol. 33, No. 1, pp. 7-8, (Jan. 2, 1997).

Preston, S.L., et al., "Size Reduction of Switched Parasitic Directional Antennas Using Genetic Algorithm Optimization Techniques," *Asia Pacific Microwave Conference Proceedings*, Yokohama, Japan, pp. 1401-1404, (1998).

Preston, S.L., et al., "Systematic Approach to the Design of Directional Antennas Using Switched Parasitic and Switched Active Elements," *Asia Pacific Microwave Conference Proceedings*, Yokohama, Japan, pp. 531-534, (1998).

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

Ruze, J., "Lateral-Feed Displacement in a Paraboloid," *IEEE Trans. Antennas and Propagation*, vol. 13, pp. 660-665, (1965).

Scott, N. L., et al., "Diversity Gain from a Single-Port Adaptive Antenna Using Switched Parasitic Elements Illustrated with a Wire and Monopole Prototype," *IEEE Trans. Antennas and Propagation*, vol. 47, No. 6, pp. 1066-1070, (Jun. 1999).

Shacham, et al., "A Selective-Repeat-ARQ Protocol for Parallel Channels and Its Resequencing Analysis," IEEE Transactions On Communications, XP000297814, 40 (4): 773-782 (Apr. 1997).

Sibille, A., et al., "Circular Switched Monopole Arrays for beam Steering Wireless Communications," *Electronics Letters*, vol. 33, No. 7, pp. 551-552, (Mar. 1997).

Simpson, W. (Editor). "RFC 1661—The Point-to-Point Protocol (PPP)." Network Working Group, Jul. 1994, pp. 1-35. http://www.faqs.org/rfcs/rfc1661.html.

Simpson, W. (Editor). "RFC 1662—PPP in HDLC-Like Framing." Network Working Group, Jul. 1994, pp. 1-17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services—High Speed Data Services (Version 0.10) CDG RF 38. Dec. 3, 1996.

*Support for 14.4 kbps Data Rate and PCS Interaction for Wideband Spread Spectrum Cellular Systems*. TSB74, Dec. 1995. TIA/EIA Telecommunications Systems Bulletin.

*Telecommunications Industry Association Meeting Summary*. Task Group I, Working Group III, Subcommittee TR45.5. Feb. 24-27, 1997. Banff, Alberta.

*Telecommunications Industry Association Meeting Summary*. Task Group I, Working Group III, Subcommittee TR45.5. Jan. 6-8, 1997. Newport Beach, California.

Third Generation Partnership Project 2, "cdma2000 High Rate Packet Data Air Interference Specification," 3GPP2 C.S0024 Version 2.0 (Oct. 27, 2000).

Third Generation Partnership Project 2, "Physical Layer Standard for cdma2000 Spread Spectrum Systems," 3GPP2 C.0002-0 Version 1.0 (Jul. 1999).

Third Generation Partnership Project, "3rd Generation Partnership Project (3GPP); Technical Specification Group (TSG) RAN WG4; Requirements for Support of Radio Resource Management (FDD)," 3G TS 25.133 V3.0.0 (Dec. 1999).

Third Generation Partnership Project, "Technical Specification Group Radio Access Network; Physical Layer Procedures (FDD) (Release 1999)." 3GPP TS 25.214 v3.1.0 (Dec. 1999).

Third Generation Partnership Project, "Technical Specification Group Radio Access Network; Physical Layer Procedures (FDD) (Release 1999)." 3GPP TS 25.214 v3.5.0 (Dec. 2000).

Third Generation Partnership Project, "Technical Specification Group Radio Access Network; Physical layer procedures (TDD) (Release 1999)," 3GPP TS 25.224 V3.1.0 (Dec. 1999).

Third Generation Partnership Project, "Technical Specification Group Radio Access Network; Physical layer procedures (TDD) (Release 1999)," 3GPP TS 25.224 V3.5.0 (Dec. 2000).

Third Generation Partnership Project, "Technical Specification Group Radio Access Network; Spreading and modulation (TDD) (Release 1999)," 3GPP TS 25.223 V3.1.0 (Dec. 1999).

Third Generation Partnership Project, "Technical Specification Group Radio Access Network; Spreading and modulation (TDD) (Release 1999)," 3GPP TS 25.223 V3.4.0 (Sep. 2000).

Third Generation Partnership Project, "Technical Specification Group Radio Access Network; Radio Resource Management Strategies (3G TR 25.922 version 3.0.0)," 3G TR 25.922 V3.0.0 (Dec. 1999).

Third Generation Partnership Project, "Technical Specification Group Radio Access Network; Radio Resource Management Strategies (Release 1999)," 3G TR 25.922 V3.4.0 (Dec. 2000).

Third Generation Partnership Project, "Technical Specification Group Radio Access Network; MAC protocol specification (3G TS 25.321 version 3.2.0)," 3G TS 25.321 V3.2.0 (Dec. 1999).

Third Generation Partnership Project, "Technical Specification Group Radio Access Network; MAC protocol specification (Release 1999)," 3G TS 25.321 V3.6.0 (Dec. 2000).

Third Generation Partnership Project, "Technical Specification Group Radio Access Network; Services provided by the physical layer (Release 1999)," 3GPP TS 25.302 V3.7.0 (Dec. 2000).

Third Generation Partnership Project, "Technical Specification Group Radio Access Network; Services provided by the physical layer (Release 1999)," 3GPP TS 25.302 V3.2.0 (Dec. 1999).

Third Generation Partnership Project, "Technical Specification Group Radio Access Network; Physical channels and mapping of transport channels onto physical channels (TDD) (3G TS 25.221 version 3.1.0)," 3G TS 25.221 V3.1.0 (Dec. 1999).

Third Generation Partnership Project, "Technical Specification Group Radio Access Network; Physical channels and mapping of transport channels onto physical channels (TDD) (Release 1999)," 3G TS 25.221 V3.5.0 (Dec. 2000).

Third Generation Partnership Project, "Technical Specification Group Radio Access Network; RRC Protocol Specification (3G TS 25.331 version 3.1.0 Release 1999)," 3G TS 25.331 V3.1.0 (Jan. 2000).

Third Generation Partnership Project, "Technical Specification Group Radio Access Network; RRC Protocol Specification (Release 1999)," 3GPP TS 25.331 V3.5.0 (Dec. 2000).

Third Generation Partnership Project, "Technical Specification Group Radio Access Network, Synchronisation in UTRAN Stage 2 (Release 1999)," 3GPP TS 25.402 V3.4.0 (Dec. 2000).

Third Generation Partnership Project, "Technical Specification Group Radio Access Network, Synchronisation in UTRAN Stage 2 (3G TS 25.402 version 3.0.0 Release 1999)," 3GPP TS 25.402 V3.4.0 (Dec. 2000).

Third Generation Partnership Project, "Technical Specification Group Radio Access Network; Physical Layer Procedures (FDD) (Release 1999)." 3GPP TS 25.214 v3.10.0 (Mar. 2002).

Third Generation Partnership Project, "Technical Specification Group Radio Access Network; Physical layer procedures (TDD) (Release 1999)," 3GPP TS 25.224 V3.10.0 (Mar. 2002).

Third Generation Partnership Project, "Technical Specification Group Radio Access Network; Spreading and modulation (TDD) (Release 1999)," 3GPP TS 25.223 V3.8.0 (Mar. 2002).

Third Generation Partnership Project, "Technical Specification Group Radio Access Network; Radio Resource Management Strategies (Release 1999)," 3G TR 25.922 V3.7.0 (Mar. 2002).

Third Generation Partnership Project, "Technical Specification Group Radio Access Network; MAC protocol specification (3G TS 25.321 version 3.2.0)," 3G TS 25.321 V3.11.0 (Mar. 2002).

Third Generation Partnership Project, "Technical Specification Group Radio Access Network; Services provided by the physical layer (Release 1999)," 3GPP TS 25.302 V3.12.0 (Mar. 2002).

Third Generation Partnership Project, "Technical Specification Group Radio Access Network; Physical channels and mapping of transport channels onto physical channels (TDD) (Release 1999)," 3G TS 25.221 V3.10.0 (Mar. 2002).

Third Generation Partnership Project, "Technical Specification Group Radio Access Network; RRC Protocol Specification (Release 1999)," 3GPP TS 25.331 V3.10.0 (Mar. 2002).

Third Generation Partnership Project, "Technical Specification Group Radio Access Network, Synchronisation in UTRAN Stage 2 (Release 1999)," 3GPP TS 25.402 V3.9.0 (Mar. 2002).

Third Generation Partnership Project, "Technical Specification Group Radio Access Network; Physical channels and mapping of transport channels onto physical channels (FDD) (Release 1999)," 3GPP TS 25.211 V3.6.0 (Mar. 2001).

Third Generation Partnership Project, "Technical Specification Group Radio Access Network; Physical channels and mapping of transport channels onto physical channels (FDD) (Release 1999)," 3GPP TS 25.211 V3.9.0 (Dec. 2001).

Third Generation Partnership Project, "Technical Specification Group Radio Access Network; Physical channels and mapping of transport channels onto physical channels (FDD) (Release 1999)," 3GPP TS 25.211 V3.9.0 (Dec. 2001).

Third Generation Partnership Project, "Technical Specification Group Radio Access Networks; UE Radio Transmission and Reception (FDD) (Release 1999)," 3GPP TS 25.101 V3.10.0 (Mar. 2002).

Third Generation Partnership Project, "Technical Specification Group Radio Access Network; Physical layer—General description (Release 1999)," 3GPP TS 25.201 V3.3.0 (Mar. 2002).

Third Generation Partnership Project, "Technical Specification Group Radio Access Network; Physical layer—General description (Release 1999)," 3GPP TS 25.201 V3.1.0 (Jun. 2000).

Third Generation Partnership Project, "Technical Specification Group Radio Access Network; UE Procedures in Idle Mode and Procedures for Cell Reselection in Connected Mode (3G TS 25.304 version 3.1.0)," 3G TS 25.304 V3.1.0 (Dec. 1999).

Third Generation Partnership Project, "Technical Specification Group Radio Access Network; Physical channels and mapping of transport channels onto physical channels (FDD) (Release 1999)," 3GPP TS 25.211 V3.5.0 (Dec. 2000).

Third Generation Partnership Project, "Technical Specification Group Radio Access Network; Multiplexing and channel coding (FDD) (Release 1999)," 3GPP TS 25.212 V3.5.0 (Dec. 2000).

Third Generation Partnership Project, "Technical Specification Group (TSG) RAN WG4 UE Radio transmission and Reception (FDD)," TS 25.101 V3.1.0 (Dec. 1999).

Third Generation Partnership Project, "Technical Specification Group Radio Access Network; Physical layer—General description (3G TS 25.201 version 3.0.0)," 3G TS 25.201 V3.0.0 (Oct. 1999).

Third Generation Partnership Project, "Technical Specification Group Radio Access Network; Physical layer—General description (Release 1999)," 3G TS 25.201 V3.1.0 (Jun. 2000).

Third Generation Partnership Project, "Technical Specification Group Radio Access Networks; Requirements for Support of Radio Resource Management (FDD) (Release 1999)," 3GPP TS 25.133 V3.4.0 (Dec. 2000).

Third Generation Partnership Project, "Technical Specification Group Radio Access Network; UE Procedures in Idle Mode and Procedures for Cell Reselection in Connected Mode (Release 1999)," 3GPP TS 25.304 V3.5.0 (Dec. 2000).

Third Generation Partnership Project, "Technical Specification Group Radio Access Network; Physical channels and mapping of transport channels onto physical channels (FDD) (3G TS 25.211 version 3.1.0)," 3G TS 25.211 V3.1.1 (Sep. 1999).

Third Generation Partnership Project, "Technical Specification Group Radio Access Networks; UE Radio Transmission and Reception (FDD) (Release 1999)," 3GPP TS 25.101 V3.5.0 (Dec. 2000).

Third Generation Partnership Project, "Technical Specification Group Group Radio Access Network; Multiplexing and channel coding (FDD) (3G TS 25.212 version 3.1.0)," 3G TS 25.212 V3.1.1 (Dec. 1999).

TIA/EIA Interim Standard, Mobile Station-Base Station Compatibility Standard for Dual-Mode Wideband Spread Spectrum Cellular System, TIA/EIA/IS-95 (Jul. 1993).

Tsui et al., "Sensitivity of EW Receivers," Microwave Journal, vol. 25, pp. 115-117, 120 (Nov. 1982).

*Upper Layer (Layer 3) Signaling Standard for cdma2000 Spread Spectrum Systems, Release C.* TIA/EIA Interim Standard. TIA/EIA/IS-2000.5-C. May, 2002.

Vaughn, R., "Switched Parasitic Elements for Antenna Diversity," *IEEE Trans. Antennas and Propagation*, vol. 47, No. 2, pp. 399-405, (Feb. 1999).

Viterbi, The Path to Next Generation Services with CDMA, Qualcomm Incorporated, 1998 CDMA Americas Congress, Los Angeles, California, Nov. 19, 1998.

Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.

Wvvw.CDG.ORG/NEWS/PRESS/1997.ASP. CDA Press Release Archive, 1997.

Yang, Samuel C., "Principles of Code Division Multiple Access," In CDMA RF System Engineering, (MA: Artech House, Inc.), 1998, Chapter 4, pp. 75-103.

* cited by examiner

SYSTEM AND METHOD FOR MAINTAINING WIRELESS CHANNELS OVER A REVERSE LINK OF A CDMA WIRELESS COMMUNICATION SYSTEM

CROSS REFERENCE TO RELATED APPLICATIONS

This application is a continuation of U.S. patent application Ser. No. 11/183,520, filed Jul. 18, 2005, which issued as U.S. Pat. No. 7,746,830 on Jun. 29, 2010, which is a continuation of U.S. patent application Ser. No. 10/755,874, filed Jan. 12, 2004, which issued as U.S. Pat. No. 6,940,842 on Sep. 6, 2005, which is a continuation of U.S. patent application Ser. No. 09/997,621, filed Nov. 29, 2001, which issued as U.S. Pat. No. 6,678,260 on Jan. 13, 2004, which is a continuation of U.S. patent application Ser. No. 09/730,376, filed Dec. 5, 2000, which issued as U.S. Pat. No. 6,707,804 on Mar. 16, 2004; which is a continuation of U.S. patent application Ser. No. 09/088,413, filed Jun. 1, 1998, which issued as U.S. Pat. No. 6,222,832 on Apr. 24, 2001. The entire teachings of the above applications are incorporated herein by reference.

BACKGROUND OF THE INVENTION

The increasing use of wireless telephones and personal computers has led to a corresponding demand for advanced telecommunication services that were once thought to only be meant for use in specialized applications. In the 1980's, wireless voice communication became widely available through the cellular telephone network. Such services were at first typically considered to be the exclusive province of the businessman because of expected high subscriber costs. The same was also true for access to remotely distributed computer networks, whereby until very recently, only business people and large institutions could afford the necessary computers and wireline access equipment. As a result of the widespread availability of both technologies, the general population now increasingly wishes to not only have access to networks such as the Internet and private intranets, but also to access such networks in a wireless fashion as well. This is particularly of concern for the users of portable computers, laptop computers, hand-held personal digital assistants and the like who would prefer to access such networks without being tethered to a telephone line.

There still is no widely available satisfactory solution for providing low cost, broad geographical coverage, high speed access to the Internet, private intranets, and other networks using the existing wireless infrastructure. This situation is most likely an artifact of several unfortunate circumstances. For one, the typical manner of providing high speed data service in the business environment over the wireline network is not readily adaptable to the voice grade service available in most homes or offices. Such standard high speed data services also do not lend themselves well to efficient transmission over standard cellular wireless handsets. Furthermore, the existing cellular network was originally designed only to deliver voice services. As a result, the emphasis in present day digital wireless communication schemes lies with voice, although certain schemes such as CDMA do provide some measure of asymmetrical behavior for the accommodation of data transmission. For example, the data rate on an IS-95 forward traffic channel can be adjusted in increments from 1.2 kbps up to 9.6 kbps for so-called Rate Set 1 and in increments from 1.8 kbps up to 14.4 kbps for Rate Set 2.

Existing systems therefore typically provide a radio channel which can accommodate maximum data rates only in the range of 14.4 kilobits per second (kbps) at best in the forward direction. Such a low data rate channel does not lend itself directly to transmitting data at rates of 28.8 or even 56.6 kbps that are now commonly available using inexpensive wireline modems, not to mention even higher rates such as the 128 kbps which are available with Integrated Services Digital Network (ISDN) type equipment. Data rates at these levels are rapidly becoming the minimum acceptable rates for activities such as browsing web pages. Other types of data networks using higher speed building blocks such as Digital Subscriber Line (XDSL) service are just now coming into use in the United States. However, their costs have only been recently reduced to the point where they are attractive to the residential customer.

Although such networks were known at the time that cellular systems were originally deployed, for the most part, there is no provision for providing higher speed ISDN- or xDSL-grade data services over cellular network topologies. Unfortunately, in wireless environments, access to channels by multiple subscribers is expensive and there is competition for them. Whether the multiple access is provided by the traditional Frequency Division Multiple Access (FDMA) using analog modulation on a group of radio carriers, or by newer digital modulation schemes that permit sharing of a radio carrier using Time Division Multiple Access (TDMA) or Code Division Multiple Access (CDMA), the nature of the radio spectrum is that it is a medium that is expected to be shared. This is quite dissimilar to the traditional environment for data transmission, in which the wireline medium is relatively inexpensive to obtain, and is therefore not typically intended to be shared.

Other considerations are the characteristics of the data itself. For example, consider that access to web pages in general is burst-oriented, with asymmetrical data rate transmission requirements. In particular, the user of a remote client computer first specifies the address of a web page to a browser program. The browser program then sends this web page address data, which is typically 100 bytes or less in length, over the network to a server computer. The server computer then responds with the content of the requested web page, which may include anywhere from 10 kilobytes to several megabytes of text, image, audio, or even video data The user then may spend at least several seconds or even several minutes reading the content of the page before requesting that another page be downloaded. Therefore, the required forward channel data rates, that is, from the base station to the subscriber, are typically many times greater than the required reverse channel data rates.

In an office environment, the nature of most employees' computer work habits is typically to check a few web pages and then to do something else for an extended period of time, such as to access locally stored data or to even stop using the computer altogether. Therefore, even though such users may expect to remain connected to the Internet or private intranet continuously during an entire day, the actual overall nature of the need to support a required data transfer activity to and from a particular subscriber unit is actually quite sporadic.

SUMMARY OF THE INVENTION

Problem Statement

What is needed is an efficient scheme for supporting wireless data communication such as from portable computers to computer networks such as the Internet and private intranets using widely available infrastructure. Unfortunately, even the most modem wireless standards in widespread use such as CDMA do not provide adequate structure for supporting the most common activities, such as web page browsing. In the forward and reverse link direction, the maximum available channel bandwidth in an IS-95 type CDMA system is only 14.4 kbps. Due to IS-95 being circuit-switched, there are only a maximum of 64 circuit-switched users that can be active at one time. In practicality, this limit is difficult to attain, and 20 or 30 simultaneous users are typically used.

In addition, the existing CDMA system requires certain operations before a channel can be used. Both access and traffic channels are modulated by so-called long code pseudonoise (PN) sequences; therefore, in order for the receiver to work properly it must first be synchronized with the transmitter. The setting up and tearing down of channels therefore requires overhead to perform such synchronization. This overhead results in a noticeable delay to the user of the subscriber unit.

An attractive method of increasing data rate for a given user is the sharing of channels in both the forward and reverse link direction. This is an attractive option, especially with the ease of obtaining multiple access with CDMA; additional users can be supported by simply adding additional codes for the forward link, or code phases in the reverse link for an IS-95 system. Ideally, this subchannel overhead would be minimized so that when additional subchannels need to be allocated to a connection, they are available as rapidly as possible.

To maintain synchronization, it is therefore advantageous to provide the sub-channels in such a way that the lowest possible speed connection is provided on a reverse link while at the same time maintaining efficient and fast ramp-up of additional code phase channels on demand. This in turn would maximize the number of available connections while minimizing the impact on the overall system capacity.

Another aspect of the present invention is directed to a subscriber access unit comprising a transceiver for providing wireless communication of digital signals. The digital signals are communicated to a base station using at least one radio frequency (RF) channel via Code Division Multiple Access (CDMA) modulated radio signals defined by orthogonal codes. Orthogonal subchannels are made available by the base station within each CDMA RF channel. A bandwidth manager is connected to the transceiver, and when the transceiver is actively sending data, at least one orthogonal subchannel is allocated by the base station on an as-needed basis. The number of orthogonal subchannels being allocated changes during a given session. The transceiver, when powered on but not actively sending data, provides an idling mode connection on a reverse link. The idling mode connection is based on an orthogonal subchannel shared with at least one other subscriber access unit, but utilizes different time slots of the shared orthogonal subchannel.

BRIEF DESCRIPTION OF THE INVENTION

The present invention is a service option overlay for an IS-95-like CDMA wireless communication system which accomplishes the above requirements. In particular, a number of subchannels for a forward link are defined within a single CDMA radio channel bandwidth, such as by assigning different orthogonal codes to each sub-channel. Multiple subchannels are defined on the reverse link by assigning different code phases of a given long pseudonoise (PN) code to each subchannel. The instantaneous bandwidth needs of each online subscriber unit are then met by dynamically allocating none, one, or multiple subchannels on an as needed basis for each network layer connection.

More particularly, the present invention efficiently provides a relatively large number of virtual physical connections between the subscriber units and the base stations on the reverse link for extended idle periods such as when computers connected to the subscriber units are powered on, but not presently actively sending or receiving data. These maintenance subchannels permit the base station and the subscriber units to remain in phase and time synchronism in an idle mode and also request additional channels. This in turn allows fast acquisition of additional subchannels as needed by allocating new code phase subchannels. Preferably, the code phases of the new channels are assigned according to a predetermined code phase relationship with respect to the code phase of the corresponding maintenance subchannel.

In an idle mode, the subscriber unit sends a synchronization or "heartbeat" message on the maintenance subchannel at a data rate which need only be fast enough to allow the subscriber unit to maintain synchronization with the base station. The duration of the heartbeat signal is determined by considering the capture or locking range of the code phase locking circuits in the receiver at the base station.

For example, the receiver typically has a PN code correlator running at the code chip rate. One example of such a code correlator uses a delay lock loop consisting of an early-late detector. A loop filter controls the bandwidth of the loop which in turn determines how long the code correlator must be allowed to operate before it can guarantee phase lock. This loop time constant determines the amount of "jitter" that can be tolerated; phase lock is typically considered to be maintainable when this is equal to a fraction of a chip time, such as about ⅛ of a chip time.

The heartbeat messages are preferably sent in time slots formed on the subchannels defined by the code phases. The use of time slotting allows a minimum number of dedicated base station receivers to maintain the idle reverse links. In particular, the reverse maintenance channel links are provided using multiple phases of the same long code as well as by assigning a time slot on such code to each subscriber unit. This reduces the overhead of maintaining a large number of connections at the base station.

Because of the time slotted nature of the reverse maintenance channel, the base station receiver can also be time shared among these various reverse links. To permit this, during each time slot allocated to a particular subscriber unit, the base station receiver first loads information concerning the last known state of its phase lock such as the last known state of early-late correlators. It then trains the early-late correlators for the required time to ensure that phase lock is still valid, and stores the state of the correlators at the end of the time slot. When additional subchannels are required to meet bandwidth demand, the additional code phases are assigned in a predetermined phase relationship with respect to the locked code in order to minimize overhead transmissions which would otherwise be needed from the base station traffic channel processor. As a result, many thousands of idle subscriber units may be supported on a single CDMA reverse link radio channel while at the same time minimizing start up delay when channels must be allocated.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF A PREFERRED EMBODIMENT

Figure 1:
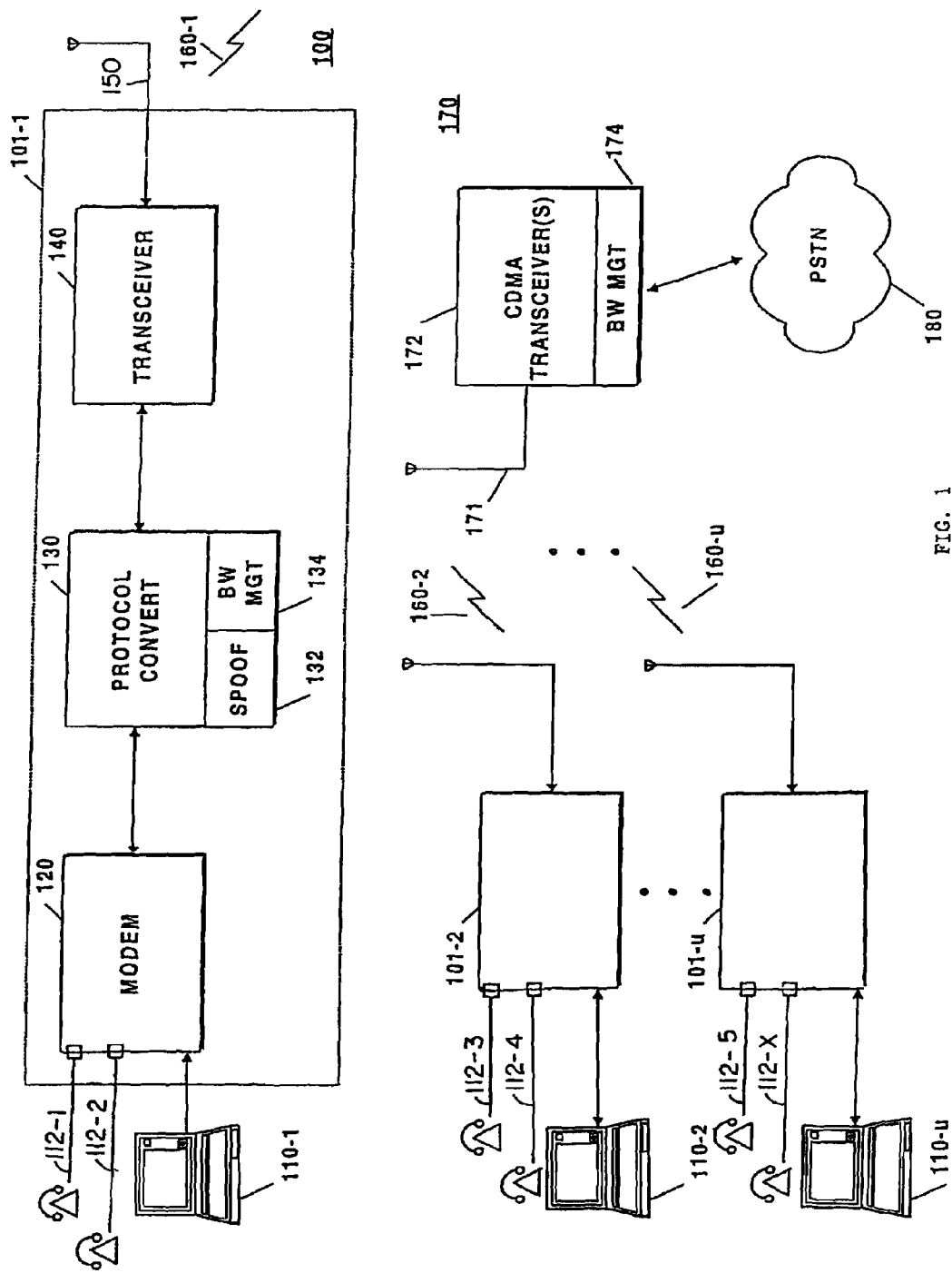
FIG. 1 is a block diagram of a wireless communication system making use of a bandwidth management scheme according to the invention.

Turning attention now to the drawings more particularly, FIG. 1 is a block diagram of a system 100 for providing high speed data and voice service over a wireless connection by seamlessly integrating a digital data protocol such as, for example, Integrated Services Digital Network (ISDN) with a digitally modulated wireless service such as Code Division Multiple Access (CDMA).

The system 100 consists of two different types of components, including subscriber units 101-1, 101-2, . . . , 101-$u$ (collectively, the subscriber units 101) and one or more base stations 170. The subscriber units 101 and base stations 170 cooperate to provide the functions necessary in order to provide wireless data services to a portable computing device 110 such as a laptop computer, portable computer, personal digital assistant (PDA) or the like. The base station 170 also cooperates with the subscriber units 101 to permit the ultimate transmission of data to and from the subscriber unit and the Public Switched Telephone Network (PSTN) 180.

More particularly, data and/or voice services are also provided by the subscriber unit 101 to the portable computer 110 as well as one or more other devices such as telephones 112-1, 112-2 (collectively referred to herein as telephones 112). The telephones 112 themselves may in turn be connected to other modems and computers which are not shown in FIG. 1. In the usual parlance of ISDN, the portable computer 110 and telephones 112 are referred to as terminal equipment (TE). The subscriber unit 101 provides the functions referred to as a network termination type 1 (NT-1). The illustrated subscriber unit 101 is in particular meant to operate with a so-called basic rate interface (BRI) type ISDN connection that provides two bearer or "B" channels and a single data or "D" channel with the usual designation being 2B+D.

The subscriber unit 101 itself consists of an ISDN modem 120, a device referred to herein as the protocol converter 130 that performs the various functions according to the invention including spoofing 132 and bandwidth management 134, a CDMA transceiver 140, and subscriber unit antenna 150. The various components of the subscriber unit 101 may be realized in discrete devices or as an integrated unit. For example, an existing conventional ISDN modem 120 such as is readily available from any number of manufacturers may be used together with existing CDMA transceivers 140. In this case, the unique functions are provided entirely by the protocol converter 130 which may be sold as a separate device. Alternatively, the ISDN modem 120, protocol converter 130, and CDMA transceiver 140 maybe integrated as a complete unit and sold as a single subscriber unit device 101. Other types of interface connections such as Ethernet or PCMCIA may be used to connect the computing device to the protocol converter 130. The device may also interface to an Ethernet interface rather than an ISDN "U" interface.

The ISDN modem 120 converts data and voice signals between the terminal equipment 110 and 112 to a format required by the standard ISDN "U" interface. The U interface is a reference point in ISDN systems that designates a point of the connection between the network termination (NT) and the telephone company.

The protocol converter 130 performs spoofing 132 and basic bandwidth management 134 functions. In general, spoofing 132 consists of insuring that the subscriber unit 101 appears to the terminal equipment 110, 112 that is connected to the public switched telephone network 180 on the other side of the base station 170 at all times. The bandwidth management function 134 is responsible for allocating and deallocating CDMA radio channels 160 as required. Bandwidth management 134 also includes the dynamic management of the bandwidth allocated to a given session by dynamically assigning sub-portions of the CDMA radio channels 160 in a manner which is more fully described below.

The CDMA transceiver 140 accepts the data from the protocol converter 130 and reformats this data in appropriate form for transmission through a subscriber unit antenna 150 over CDMA radio link 160-1. The CDMA transceiver 140 may operate over only a single 1.25 MHz radio frequency channel or, alternatively, in a preferred embodiment, may be tunable over multiple allocatable radio frequency channels.

CDMA signal transmissions are then received and processed by the base station equipment 170. The base station equipment 170 typically consists of multichannel antennas 171, multiple CDMA transceivers 172, and a bandwidth management functionality 174. Bandwidth management 174 controls the allocation of CDMA radio channels 160 and subchannels, in a manner analogous to the subscriber unit 101. The base station 170 then couples the demodulated radio signals to the Public Switch Telephone Network (PSTN) 180 in a manner which is well known in the art. For example, the base station 170 may communicate with the PSTN 180 over any number of different efficient communication protocols such as primary rate ISDN, or other LAPD based protocols such as IS-634 or V5.2.

It should also be understood that data signals travel bidirectionally across the CDMA radio channels 160. In other words, data signals received from the PSTN 180 are coupled to the portable computer 110 in a forward link direction, and data signals originating at the portable computer 110 are coupled to the PSTN 180 in a so-called reverse link direction. The present invention involves in particular the manner of implementing the reverse link channels.

Continuing to refer to FIG. 1 briefly, spoofing 134 therefore involves having the CDMA transceiver 140 loop back these synchronous data bits over the ISDN communication path to spoof the terminal equipment 110, 112 into believing that a sufficiently wide wireless communication link 160 is continuously available. However, only when there is actually data present from the terminal equipment to the wireless transceiver 140 is wireless bandwidth allocated. Therefore, the network layer need not allocate the assigned wireless bandwidth for the entirety of the communications session. That is, when data is not being presented upon the terminal equipment to the network equipment, the bandwidth management function 134 deallocates initially assigned radio channel bandwidth 160 and makes it available for another transceiver and another subscriber unit 101.

Figure 2:
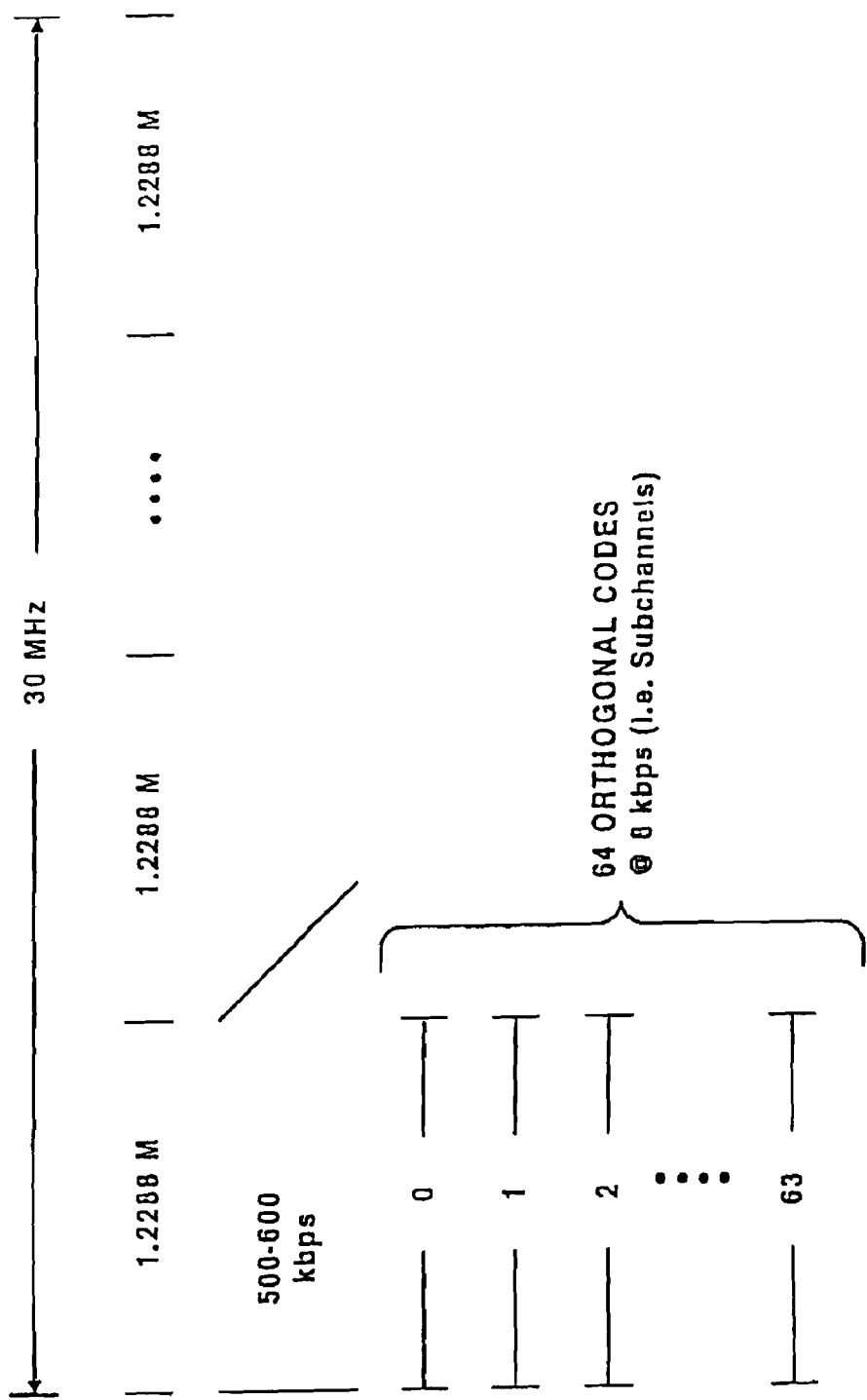
FIG. 2 is a diagram showing how subchannels are assigned within a given radio forward link frequency (RF) channel.

In order to better understand how bandwidth management 134 and 174 accomplish the dynamic allocation of radio channels, turn attention now to FIG. 2. This figure illustrates one possible frequency plan for the wireless links 160 according to the invention. In particular, a typical transceiver 170 can be tuned on command to any 1.25 MHz channel within a much larger bandwidth, such as up to 30 MHz. In the case of location in an existing cellular radio frequency bands, these bandwidths are typically made available in the range of from 800 to 900 MHz. For personal communication systems (PCS) type wireless systems, the bandwidth is typically allocated in the range from about 1.8 to 2.0 GigaHertz (GHz). In addition, there are typically two matching bands active simultaneously, separated by a guard band, such as 80 MHz; the two matching bands form forward and reverse full duplex link.

Each of the CDMA transceivers, such as transceiver 140 in the subscriber unit 101, and transceivers 172 in the base station 170, are capable of being tuned at any given point in time to a given 1.25 MHz radio frequency channel. It is generally understood that such 1.25 MHz radio frequency carrier provides, at best, a total equivalent of about 500 to 600 kbps maximum data rate transmission within acceptable bit error rate limitations.

In contrast to this, the present invention subdivides the available approximately 500 to 600 kbps data rate into a relatively large number of subchannels, as shown in FIG. 2, for example. In the illustrated example, the bandwidth is divided into sixty-four (64) subchannels 300, each providing an 8 kbps data rate. A given subchannel 300 is physically implemented by encoding a transmission with one of a number of different assignable pseudorandom codes. For example, the 64 subchannels 300 may be defined within a single CDMA RF carrier by using a different orthogonal code for each defined subchannel 300 for example, for the forward link.

As mentioned above, subchannels 300 are allocated only as needed. For example, multiple subchannels 300 are granted during times when a particular ISDN subscriber unit 101 is requesting that large amounts of data be transferred. These subchannels 300 are quickly released during times when the subscriber unit 101 is relatively lightly loaded.

The present invention relates in particular to maintaining the reverse link so that synchronization of the subchannels does not need to be reestablished each time that channels are taken away and then granted back.

Figure 3:
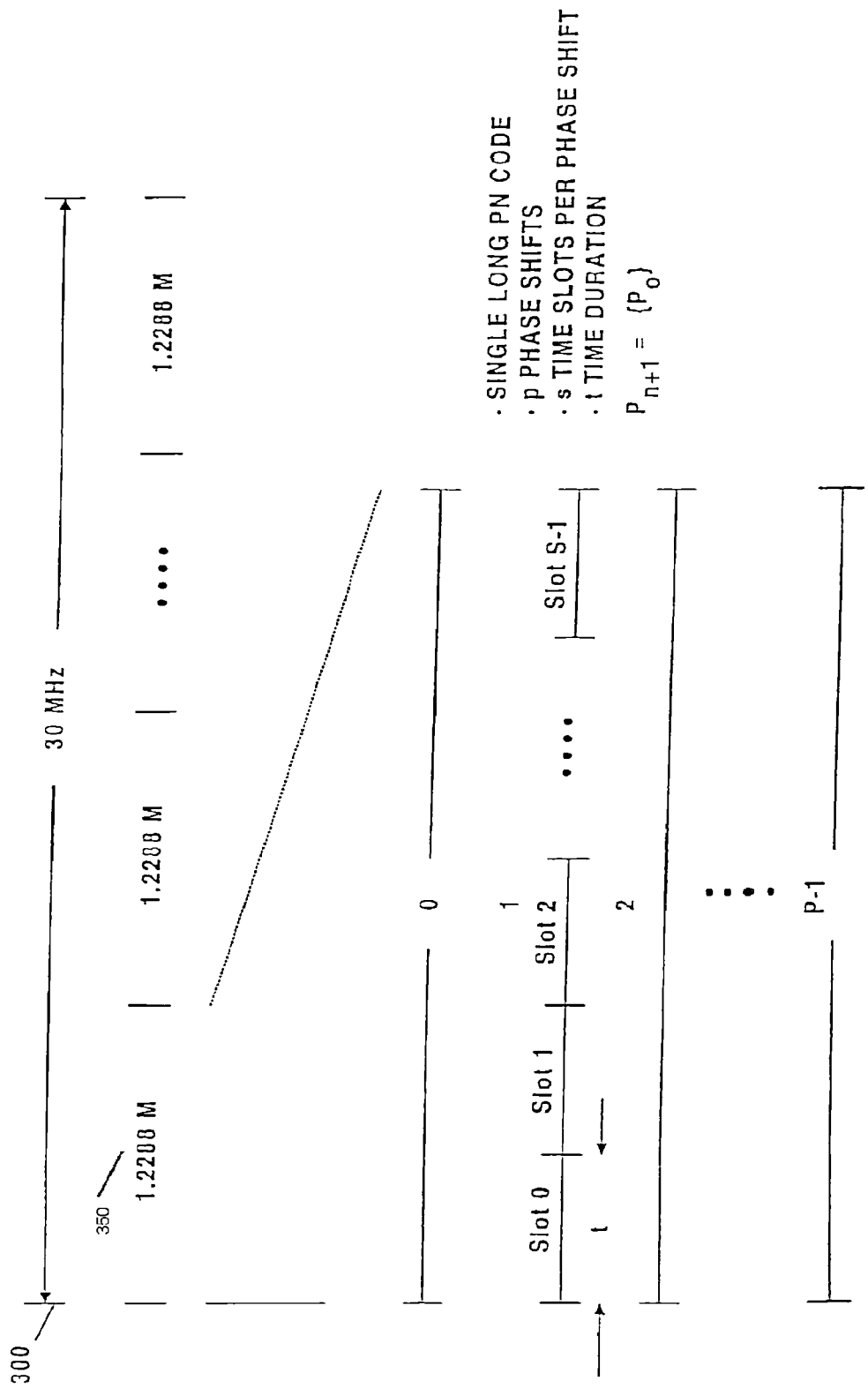
FIG. 3 is a diagram showing how subchannels are assigned within a given reverse link RF channel.

FIG. 3 is a diagram illustrating the arrangement of how the subchannels are assigned on the reverse link. It is desirable to use a single radio carrier signal on the reverse link to the extent possible to conserve power as well as to conserve the receiver resources which must be made available at the base station. Therefore, a single 1.2288 MHz band 350 is selected out of the available radio spectrum.

A relatively large number, N, such as 1000 individual subscriber units are then supported by using a single long pseudonoise (PN) code in a particular way. First, a number, p, of code phases are selected from the available $2^{42}-1$ different long code phases. A given long code phase is unique to a particular subscriber unit and never changes. As will be explained, this is also true for supplemental code phases as well. The code p phase shifts are then used to provide p subchannels. Next, each of the p subchannels are further divided into s time slots. The time slotting is used only during the idle mode, and provides two advantages; it reduces the numbers of "maintenance" receivers in the base station, and it reduces the impact to reverse channel capacity by reducing transmit power and thus interference. Therefore, the maximum supportable number of supportable subscriber units, N, is p times s. During Idle mode, use of the same PN code with different phases and time slots provides many different subchannels with permits using a single rake receiver in the base station 104.

In the above mentioned channel allocation scheme, radio resources are expected to be allocated on an as-needed basis. However, consideration must also be given to the fact that normally, in order to set up a new CDMA channel, a given reverse link channel must be given time to acquire code phase lock at the receiver. The present invention avoids the need to wait for each channel to acquire code phase lock each time that it is set up by several mechanisms which are described more fully below. In general, the technique is to send a maintenance signal at a rate which is sufficient to maintain code phase lock for each subchannel even in the absence of data.

The objective here is to minimize the size of each time slot, which in turn maximizes the number of subscribers that can be maintained in an idle mode. The size, t, of each time slot is determined by the minimum time that it takes to guarantee phase lock between the transmitter at the subscriber unit and the receiver in the base station. In particular, a code correlator in the receiver must receive a maintenance or "heartbeat" signal consisting of at least a certain number of maintenance bits over a certain unit of time. In the limit, this heartbeat signal is sent by sending at least one bit from each subscriber unit on each reverse link at a predetermined time, e.g., its designated time slot on a predetermined one of the N subchannels.

The minimum time slot duration, t, therefore depends upon a number of factors including the signal to noise ratio and the expected maximum velocity of the subscriber unit within the cell. With respect to signal to noise ratio, this depends on $$E_b/N_o+I_o$$

where $E_b$ is the energy per bit, $N_o$ is the ambient noise floor, and $I_o$ is the mutual interference from other coded transmissions of the other sub-channels on the reverse link sharing the same spectrum. Typically, to close the link requires integration over 8 chip times at the receiver, and a multiple of 20 times that is typically needed to guarantee detection. Therefore, about 160 chip times are typically required to correctly receive the coded signal on the reverse link. For a 1.2288 MHz code, $T_c$, the chip time, is 813.33 ns, so that this minimum integration time is about 130 μs. This in turn sets the absolute minimum duration of a data bit, and therefore, the minimum duration of a slot time, t. The minimum slot time of 130 μs means that at a maximum, 7692 time slots can be made available per second for each phase coded signal.

To be consistent with certain power control group timing requirements, the time slot duration can be relaxed somewhat. For example, in the IS-95 standard, a power control group timing requirement requires a power output sample from each subscriber unit every 1.25 ms.

Once code phase lock is acquired, the duration of the heartbeat signal is determined by considering the capture or locking range of the code phase locking circuits in the receiver at the base station. For example, the receiver typically has a PN code correlator running at the code chip rate. One example of such a code correlator uses a delay lock loop consisting of an early-late detector. A loop filter controls the bandwidth of this loop which in turn determines how long the code correlator must be allowed to operate before it can guarantee phase lock. This loop time constant determines the amount of "jitter" that can be tolerated in the code correlator, such as about ⅛ of a chip time, $T_c$.

In the preferred embodiment, the system 100 is intended to support so-called nomadic mobility. That is, high mobility operation within moving vehicles typical of cellular telephony is not expected to be necessary. Rather, the typical user of a portable computer who is active is moving at only brisk walking speeds of about 4.5 miles per hour (MPH). At 4.5 MPH, corresponding to a velocity of 6.6 feet per second, a user will move 101 feet in ⅛ of the 1/1.2288 MHz chip time (Tc). Therefore, it will take about 101 feet divided by 6.6 feet, or about 15 seconds for such a user to move a distance which is sufficiently far for him to a point where the code phase synchronization loop cannot be guaranteed to remain locked. Therefore, as long as a complete synchronization signal is sent for a given reverse link channel every 15 seconds, the reverse link loop will therefore remain in lock.

Figure 4:
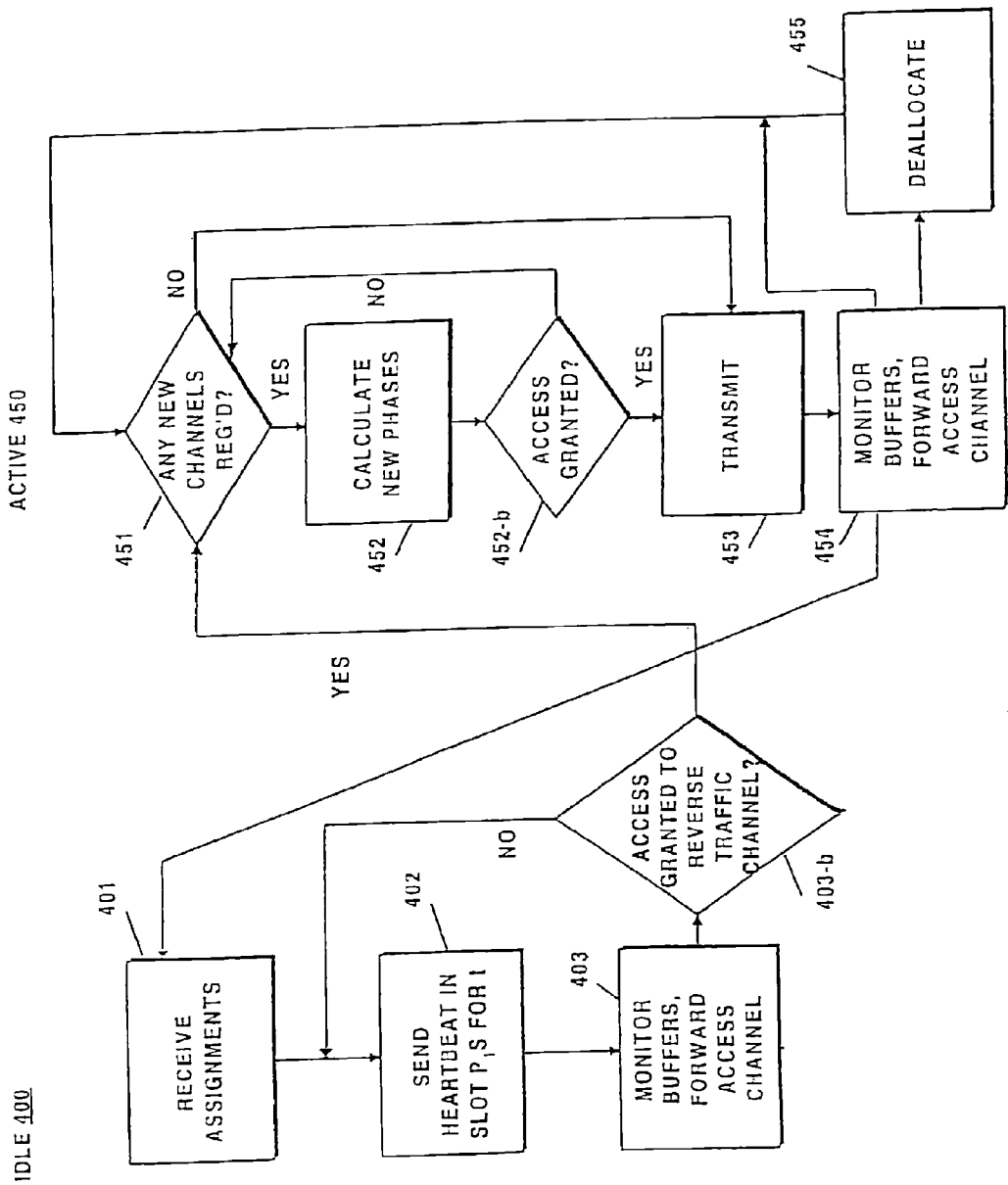
FIG. 4 is a state diagram for a reverse link bandwidth management function in the subscriber unit.

FIG. 4 is a state diagram for a reverse link bandwidth management function in the subscriber unit. In an idle mode 400, a first state 401 is entered in which the subscriber unit receives a time slot assignment for its code phase reverse channel. This time slot is only used in the idle mode. The same long code phase is pre-assigned and is permanent to the subscriber unit.

In a next state 402, the heartbeat signal is sent in the assigned time slots. A state 403 is then entered in which the subscriber unit monitors its internal data buffers to determine whether additional code phase channels are required to support the establishment of a reverse link with sufficient bandwidth to support an active traffic channel. If this is not the case, then the subscriber returns to state 402 and remains in the idle mode 400.

Prior to entering the Active state 450 from Idle mode 400, the subscriber unit must make a request to the base station. If granted, (step 403-b), processing proceeds to step 451, and if not granted, processing proceeds to step 402. However, the subscriber unit knows that it is assigned code phase channels in a predetermined relationship to the code phase channel of its fundamental channel, i.e., $$P_{n+1} = \mathcal{F}\{P_o\}$$

where $P_{n+1}$ is the code phase for the new channel (n+1), and $P_o$ is the code phase assigned to the fundamental channel for the particular subscriber. Such a code phase relationship $\mathcal{F}$ may be, for example, to select uniformly from the available $2^{42}$ codes, every $2^{42}/2^{10}$th or every $2^{32}$th code phase in a system which is supporting 1024 ($2^{10}$) reverse links, for a single subscriber.

A number, C, of these new code phases are therefore instantaneously calculated based simply upon the number of additional code phase channels, and without the need to require code phase synchronization for each new channel.

After step 452 is processed, a request is made for code phase channels. If granted (step 452-b), processing proceeds to step 453, and if not granted, processing proceeds to step 451 in order to process the additional channel requests. In a next state 453, the subscriber unit begins transmitting its data on its assigned code phase channels. In state 454, it continues to monitor its internal data buffers and its associated forward access channel to determine when to return to the idle mode 400, to state 451, to determine if new code phase channels must be assigned, or to state 455, where they are deallocated.

Figure 5:
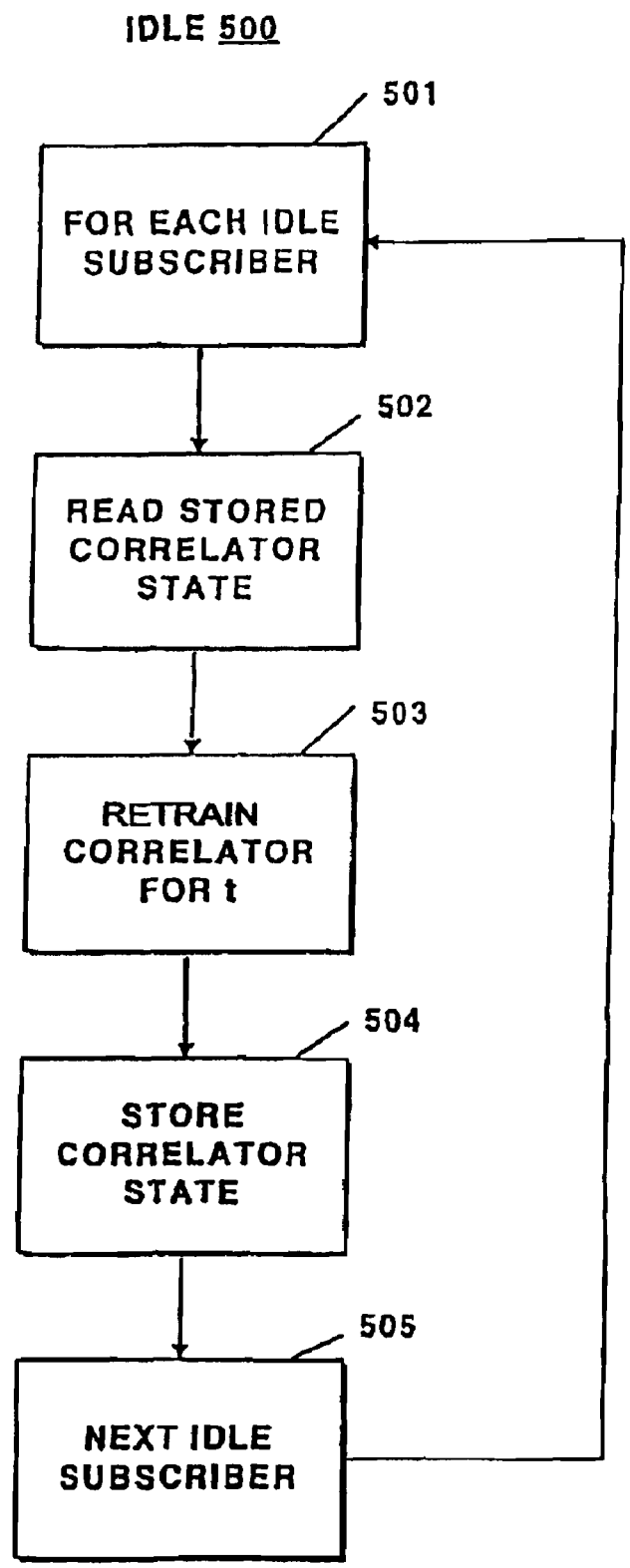
FIG. 5 is a state diagram of the reverse link bandwidth management function in the base station.

FIG. 5 is a state diagram of idle mode processing in the reverse link management function in the base station 104. In a first state 501, for each idle subscriber unit 101, a state 502 is entered in which a stored state of the correlators for the present time slot (p,s) from a previous synchronization session is read. In a next state 503, an early-late correlator is retrained for the time slot duration, t. In a next state 504, the correlator state is stored; in state 505, the loop is continued for each subscriber.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, instead of ISDN, other wireline and network protocols maybe encapsulated, such as xDSL, Ethernet, and X.25, and therefore may advantageously use the dynamic wireless subchannel assignment scheme described herein.

Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A subscriber unit comprising:
   a transceiver configured to establish a communication link with a base station;
   wherein the transceiver is further configured to transmit data to the base station over a plurality of code division multiple access (CDMA) channels in all time intervals; wherein a time interval includes at least one time slot;
   wherein the transceiver is further configured to receive time interval assignment; and
   wherein the transceiver is further configured, in response to receiving time interval assignment, to transmit a single CDMA channel, having a burst pattern, in at least one time interval and not transmit any CDMA channels in other time intervals.

2. The subscriber unit as in claim 1 wherein the transceiver is further configured, in response to not receiving the time interval assignment, to transmit the plurality of CDMA channels in all time intervals.

3. The subscriber unit as in claim 1 wherein a number of the CDMA channels used to transmit the data varies.

4. The subscriber unit as in claim 1 wherein the plurality of CDMA channels and the single CDMA channel are derived from at least one pseudonoise (PN) code.

5. The subscriber unit as in claim 1 wherein the burst pattern is transmitted using a minimum set of time intervals in which the transceiver transmits the burst pattern to maintain synchronization.

6. A method comprising:
   establishing by a subscriber unit a communication link with a base station;
   transmitting by the subscriber unit data to the base station over a plurality of code division multiple access (CDMA) channels in all time intervals; wherein a time interval includes at least one time slot;
   receiving by the subscriber unit time interval assignment; and
   transmitting by the subscriber unit, in response to the time interval assignment, a single CDMA channel, having a burst pattern, in at least one time interval and not transmit any CDMA channels in other time intervals.

7. The method as in claim 6 wherein in response to not receiving time interval assignment, transmitting by the subscriber unit the plurality of CDMA channels in all time intervals.

8. The method as in claim 6 wherein a number of the CDMA channels used to transmit the data varies.

9. The method as in claim 6 wherein the plurality of CDMA channels and the single CDMA channel are derived from at least one pseudonoise (PN) code.

10. The method as in claim 6 wherein the burst pattern is transmitted in a minimum set of time intervals in which the transceiver transmits the burst pattern to maintain synchronization.

11. A base station comprising:
a transceiver configured to establish a communication link with a subscriber unit;
wherein the transceiver further is configured to receive data over a plurality of code division multiple access (CDMA) channels from the subscriber unit in all time intervals; wherein a time interval includes at least one time slot;
wherein the transceiver is further configured to transmit time interval assignment; and
wherein the transceiver is further configured to receive, in response to transmitting the time interval assignment, a single CDMA channel, having a burst pattern, in at least one time interval and not receiving any CDMA channels in other time intervals from the subscriber unit.

12. The base station as in claim 11 wherein the transceiver is further configured, in response to not transmitting the time interval assignment, to receive the plurality of CDMA channels in all time intervals.

13. The base station as in claim 11 wherein a number of the CDMA channels used to receive the data varies.

14. The base station as in claim 11 wherein the plurality of CDMA channels and the single CDMA channel are derived from at least one pseudonoise (PN) code.

15. The base station as in claim 11 wherein the burst pattern is received in a minimum set of time intervals to maintain synchronization with the subscriber unit.

* * * * *